United States Patent
Kachiwazaki et al.

(10) Patent No.: US 12,357,891 B2
(45) Date of Patent: Jul. 15, 2025

(54) GAME PADDLE

(71) Applicant: Sport Squad, Inc., Rockville, MD (US)

(72) Inventors: Fabio Kachiwazaki, São Paulo (BR); Austin Kim, Columbia, MD (US); Richard Lee, Potomac, MD (US)

(73) Assignee: Sport Squad, Inc., Rockville, MD (US)

( * ) Notice: Subject to any disclaimer, the term of this patent is extended or adjusted under 35 U.S.C. 154(b) by 0 days.

(21) Appl. No.: 19/028,832

(22) Filed: Jan. 17, 2025

(65) Prior Publication Data

US 2025/0161772 A1 May 22, 2025

Related U.S. Application Data

(63) Continuation of application No. PCT/US2024/042535, filed on Aug. 15, 2024, which
(Continued)

(51) Int. Cl.
*A63B 59/42* (2015.01)
*A63B 60/54* (2015.01)
(Continued)

(52) U.S. Cl.
CPC ............... *A63B 59/42* (2015.10); *B32B 3/08* (2013.01); *B32B 3/12* (2013.01); *B32B 5/02* (2013.01);
(Continued)

(58) Field of Classification Search
CPC ......... A63B 59/40; A63B 59/42; A63B 60/54; A63B 60/40; A63B 59/45; A63B 59/48
See application file for complete search history.

(56) References Cited

U.S. PATENT DOCUMENTS

| | | | |
|---|---|---|---|
| 3,879,035 A | | 4/1975 | Danchulis et al. |
| 3,949,988 A | * | 4/1976 | Staufer ............ A63B 49/11 264/45.2 |

(Continued)

FOREIGN PATENT DOCUMENTS

| | | |
|---|---|---|
| CN | 219167665 U | 6/2023 |
| WO | 2022182992 A1 | 9/2022 |

(Continued)

OTHER PUBLICATIONS

U.S. Appl. No. 63/535,565, filed Aug. 30, 2023, Fabio Kachiwazaki.
(Continued)

*Primary Examiner* — Michael D Dennis
(74) *Attorney, Agent, or Firm* — Bass Patent Law, LLC

(57) ABSTRACT

The present teachings generally include game paddles such as pickleball paddles. For example, a pickleball paddle disclosed herein may include a first surface, a second surface, and a core disposed therebetween, where the core defines a plurality of gaps that can accommodate one or more fillers, e.g., to provide vibration dampening and/or to otherwise affect performance, comfort, and enjoyment. In an example aspect, a gap is disposed on each side of the paddle near a throat portion thereof, where a first filler is inserted therein. The first filler may be viewable within such gaps—e.g., where an edge guard includes a window for viewing the first filler. A paddle according to the present teachings may have a frame (e.g., a frame that accommodates one or more gaps) or it may be frameless. In some aspects, a frame may also or instead include a filler disposed therein and/or adjacent thereto.

29 Claims, 38 Drawing Sheets

Related U.S. Application Data is a continuation of application No. 18/389,174, filed on Nov. 13, 2023.

(60) Provisional application No. 63/543,865, filed on Oct. 12, 2023, provisional application No. 63/535,565, filed on Aug. 30, 2023.

(51) Int. Cl.
*B32B 3/08* (2006.01)
*B32B 3/12* (2006.01)
*B32B 5/02* (2006.01)
*B32B 5/18* (2006.01)

(52) U.S. Cl.
CPC ............... *B32B 5/18* (2013.01); *A63B 60/54* (2015.10); *A63B 2209/02* (2013.01); *B32B 2262/106* (2013.01); *B32B 2266/0214* (2013.01)

(56) References Cited

U.S. PATENT DOCUMENTS

| | | | |
|---|---|---|---|
| 4,192,506 A | 3/1980 | Sofia | |
| 4,194,738 A | 3/1980 | Inoue et al. | |
| 4,331,331 A | 5/1982 | Rodgers, Jr. | |
| 4,379,554 A * | 4/1983 | Schuyler | A63B 59/40 473/530 |
| 5,172,911 A | 12/1992 | Chang | |
| 5,649,873 A | 7/1997 | Fuller | |
| 10,377,093 B2 | 8/2019 | Filippini | |
| 2011/0201461 A1* | 8/2011 | Gazzara | A63B 60/50 473/527 |
| 2015/0224370 A1 | 8/2015 | Yamamoto | |
| 2017/0021247 A1 | 1/2017 | Marvin | |
| 2017/0136325 A1 | 5/2017 | Fox et al. | |
| 2018/0104555 A1 | 4/2018 | Taylor | |
| 2018/0353820 A1 | 12/2018 | Davis | |
| 2020/0290243 A1 | 9/2020 | Avnery et al. | |
| 2020/0360778 A1 | 11/2020 | Lee | |
| 2021/0252356 A1* | 8/2021 | Thurman | A63B 59/42 |
| 2021/0252357 A1 | 8/2021 | Lee | |
| 2021/0260452 A1* | 8/2021 | Zheng | B32B 3/04 |
| 2022/0032141 A1* | 2/2022 | Brents | A63B 60/54 |
| 2023/0047371 A1 | 2/2023 | Lee | |
| 2023/0149784 A1 | 5/2023 | Lee | |
| 2023/0191215 A1 | 6/2023 | Barnes et al. | |
| 2023/0415010 A1 | 12/2023 | Luo | |
| 2024/0165468 A1 | 5/2024 | Shu | |

FOREIGN PATENT DOCUMENTS

| | | |
|---|---|---|
| WO | 2024076417 A1 | 4/2024 |
| WO | 2025049122 A1 | 3/2025 |

OTHER PUBLICATIONS

U.S. Appl. No. 63/543,865, filed Oct. 12, 2023, Fabio Kachiwazaki.
Gearbox, "Pro Power Elongated," https://gearboxsports.com/collections/all-pickleball-paddles/products/pro-power-elongated, 2023, 9 pages.
ISA/EP, PCT Application No. PCT/US24/42535, International Search Report and Written Opinion dated Nov. 12, 2024, 15 pages.
Image of cutaway of Selkirk LABS Project 002 paddle (Aug. 2023), 1 page.
Selkirk LABS Project 002, website captured by Wayback Machine on Jun. 2, 2022, currently available at https://www.selkirklabs.com/products/selkirk-labs-project-002 (website capture date is Jun. 2, 2022), 3 pages.
USPTO, U.S. Appl. No. 19/027,671, Non-Final Office Action dated Apr. 4, 2025, 29 pages.

* cited by examiner

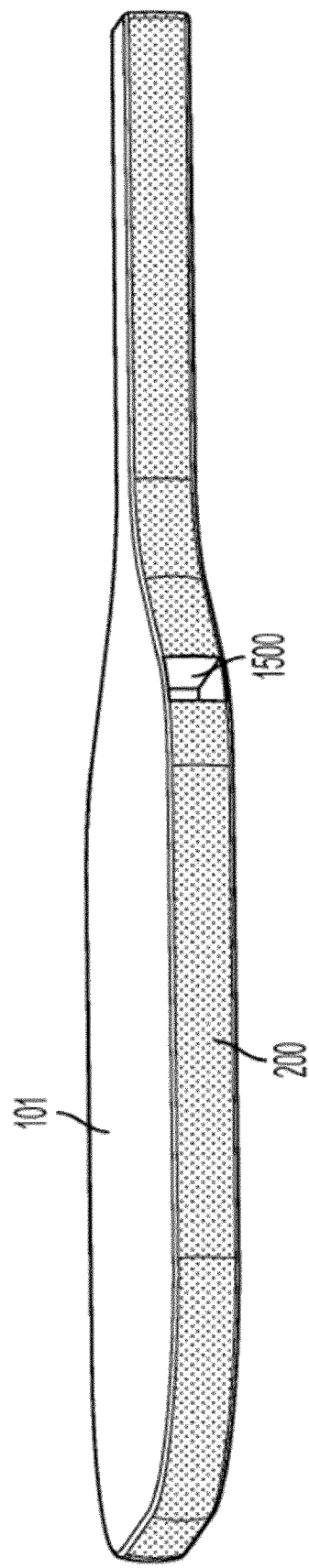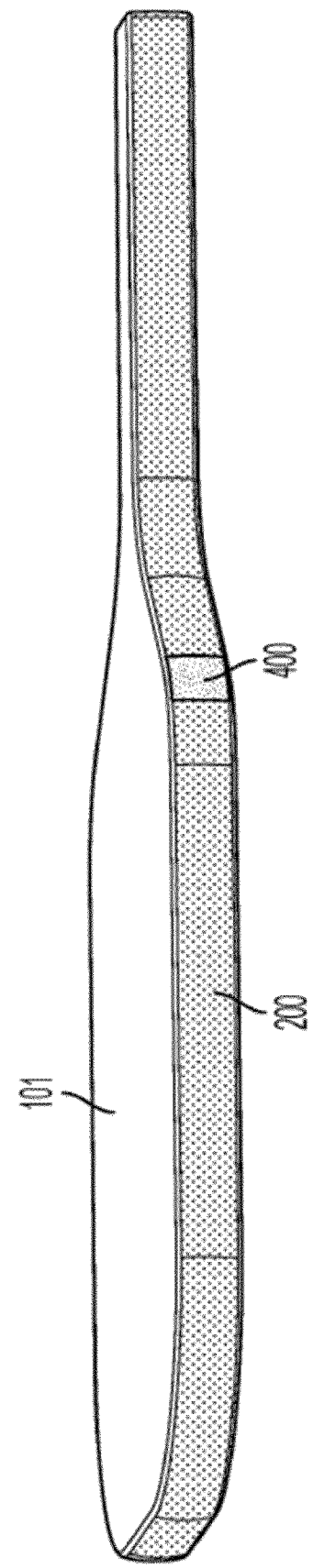

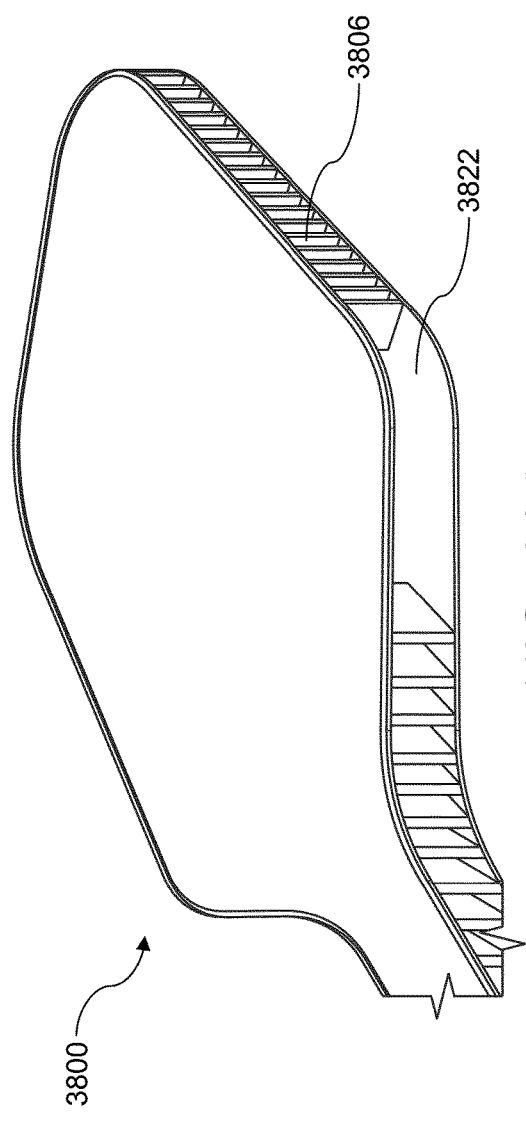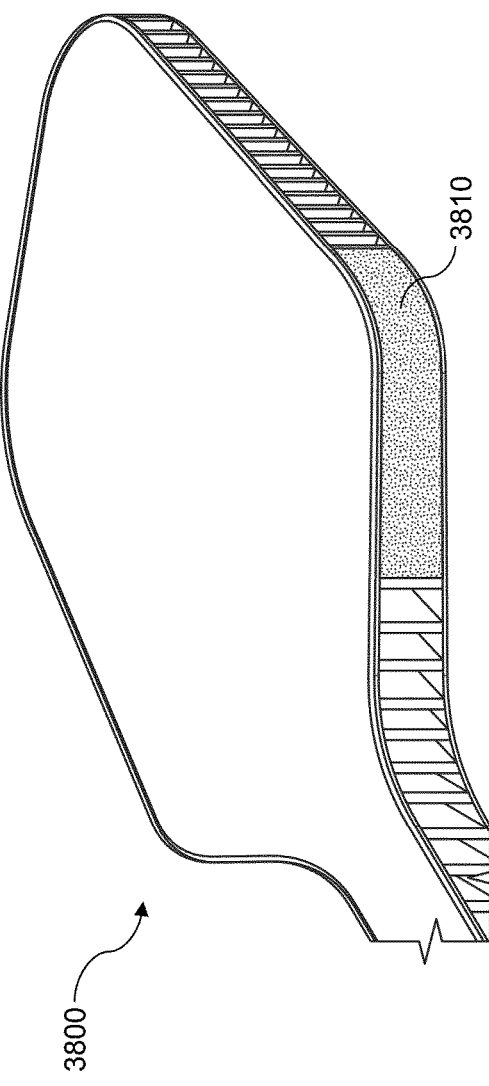

GAME PADDLE

CROSS-REFERENCE TO RELATED APPLICATIONS

This application is a bypass continuation that claims priority to International Patent Application No. PCT/US2024/042535 filed on Aug. 15, 2024, which claims priority to U.S. Provisional Pat. App. Ser. No. 63/535,565 filed on Aug. 30, 2023, and U.S. Provisional Pat. App. Ser. No. 63/543,865 filed on Oct. 12, 2023. International Patent Application No. PCT/US2024/042535 also claims priority to U.S. patent application Ser. No. 18/389,174 filed on Nov. 13, 2023, which itself claims priority to U.S. Provisional Pat. App. Ser. No. 63/535,565 filed on Aug. 30, 2023, and U.S. Provisional Pat. App. Ser. No. 63/543,865 filed on Oct. 12, 2023. Each of the foregoing applications is hereby incorporated by reference in its entirety.

FIELD

The present disclosure generally relates to game paddles and the like—e.g., pickleball paddles—as well as methods for making and using the same.

BACKGROUND

Paddles for paddle sports have been used for ages. A paddle typically refers to a paddle that is not comprised of strings (such as a tennis racket). Paddles are used to play games such as pickleball, paddleball, and the like. In particular, pickleball is a paddle sport that generally combines elements of tennis, badminton, and ping-pong. It is played on a court with similar dimensions to a badminton court with a net dividing opposing sides. The game is played with a perforated plastic ball and solid paddles made of, for example, wood, graphite, and/or composite materials. In general, players use their paddles to hit the ball over the net, aiming to land the ball within the boundaries of the opposing side of the court.

Traditionally, paddles have been constructed with a solid core material, such as wood, foam, or composite materials, sandwiched between two outer surfaces. While these designs have proven effective, there is an ongoing desire to improve paddle performance, durability, and ergonomics. For example, an area of focus in paddle design has been weight distribution and balance. The distribution of weight within a paddle can affect its maneuverability, power transfer, and overall feel in a player's hand. Another consideration in paddle design is vibration dampening. The impact of a ball or other object on the paddle surface can create vibrations that may be transmitted to the player's hand and arm. Excessive vibration can lead to discomfort, reduced control, and potentially contribute to conditions such as tennis elbow. Durability is also a key factor in paddle design. Paddles are subjected to repeated impacts and varying environmental conditions, which can lead to wear and tear over time. Improving the longevity of paddles while maintaining their performance characteristics is an ongoing challenge.

As the popularity of paddle sports such as pickleball continues to grow, there remains a need for improvements that can enhance player performance, comfort, and enjoyment.

SUMMARY

The present teachings generally include game paddles such as pickleball paddles. For example, a pickleball paddle disclosed herein may include a first surface, a second surface, and a core disposed therebetween, where the core defines a plurality of gaps that can accommodate one or more fillers, e.g., to provide vibration dampening and/or to otherwise affect performance, comfort, and enjoyment. In an example aspect, a gap is disposed on each side of the paddle near a throat portion thereof, where a first filler is inserted therein. The first filler may be viewable within such gaps—e.g., where an edge guard includes a window for viewing the first filler. A paddle according to the present teachings may have a frame (e.g., a frame that accommodates one or more gaps) or it may be frameless. In some aspects, a frame may also or instead include a filler disposed therein and/or adjacent thereto.

In one aspect, a pickleball paddle disclosed herein may include: a front surface; a back surface opposing the front surface; a core disposed between the front surface and the back surface; a gap formed in at least a portion of the core; a first filler disposed within at least a portion of the gap; a frame disposed about at least a head portion of the pickleball paddle along an edge portion thereof, the frame at least partially disposed between the front surface and the back surface along the edge portion, the frame defining a hollow interior portion; and a second filler disposed within at least a portion of the hollow interior portion of the frame.

Implementations may include one or more of the following features. One or more of the first filler and the second filler may include a foam material. One or more of the first filler and the second filler may include at least one of: a polymer, a thermoplastic, a thermoset material, a thermoplastic elastomer, an elastomer, a rubber, and an expandable material. One or more of the first filler and the second filler may include pressurized air. The second filler and the first filler may be the same material. The second filler and the first filler may be different materials. The gap may be disposed, at least in part, between the frame and the core. The gap may border the frame. The frame may surround the entire pickleball paddle. The frame may include carbon fiber. The frame may be a hollow cuboid structure. The hollow cuboid structure may be formed from a single piece of material. The core may at least partially include a honeycomb structure. The pickleball paddle may include an edge guard covering at least a portion of the frame along at least part of the head portion of the pickleball paddle.

In one aspect, a pickleball paddle disclosed herein may include: a front surface; a back surface opposing the front surface; a core disposed between the front surface and the back surface; a gap formed in at least a portion of the core along a throat portion of the pickleball paddle; and a first filler disposed within at least a portion of the gap.

Implementations may include one or more of the following features. The first filler may include a material structurally configured to absorb vibrations caused by striking a ball with one or more of the front surface and the back surface of the pickleball paddle. The pickleball paddle may include a frame disposed about at least a head portion of the pickleball paddle along an edge portion thereof, the frame at least partially disposed between the front surface and the back surface along the edge portion, the frame defining a hollow interior portion fillable with a second filler.

In one aspect, a method of manufacturing a pickleball paddle disclosed herein may include: forming a core of a pickleball paddle having a head portion and a handle portion; forming one or more gaps in the core of the pickleball paddle; inserting a first filler within at least a portion of the one or more gaps; wrapping a frame about a perimeter of the core; and affixing both a front surface and a back surface to the core wrapped by the frame. The frame may define a hollow interior portion. The method may further include inserting a second filler within at least a portion of the hollow interior portion of the frame.

In one aspect, a pickleball paddle disclosed herein may include: a first surface; a second surface; a core disposed between the first surface and the second surface, the core including a first material; at least two gaps in the core defined by absence of the first material of the core, a first gap of the at least two gaps disposed on a first side of the paddle substantially adjacent to a throat portion thereof, and a second gap of the at least two gaps disposed on a second side of the paddle substantially adjacent to the throat portion thereof; and a first filler disposed within one or more of the first gap and the second gap.

Implementations may include one or more of the following features. The pickleball paddle may include an edge guard disposed along a perimeter of a head portion of the paddle. The edge guard may define a void adjacent to each of the first gap and the second gap. The first filler may be viewable through the void. The void may include an at least semi-transparent material through which the first filler is viewable. The first filler may include one or more markings. The one or more markings may indicate a property of one or more of the paddle, the first filler, and the core. The one or more markings may include a color of the first filler. The one or more markings may include one or more of a texture and a pattern of the first filler. The void may be formed via a cutout in material of the edge guard. The first filler may be exposed to an external environment through the cutout. The pickleball paddle may include a frame disposed between the first surface and the second surface. The frame may be substantially disposed along, or adjacent to, a perimeter of a head portion of the paddle. The frame may accommodate the first gap and the second gap. The frame may include one or more indented portions that accommodate the first gap and the second gap. The frame may be absent along the first gap and the second gap. The frame may be shaped to form a boundary of each of the first gap and the second gap along an interior portion of the paddle. The pickleball paddle may include a gap formed in the core adjacent to the frame along an interior portion of the paddle. The pickleball paddle may include a second filler disposed within the gap. The second filler and the first filler may be the same. The second filler and the first filler may be different. One or more of the first filler and the second filler may include at least one of: a foam, ethyl vinyl acetate (EVA) foam, a polymer, a thermoplastic, a thermoset, a thermoplastic elastomer, an elastomer, a rubber, an expandable material, and a fluid. The frame may define an interior that may include a third filler. The third filler and the first filler may be the same. The third filler and the second filler may be different. The third filler may include compressed air. The first filler may be disposed within each of the first gap and the second gap. The first filler may be substantially the same within each of the first gap and the second gap. The first filler may infiltrate one or more of the first gap and the second gap by at least 5 millimeters. The first filler may include one or more of a foam, ethyl vinyl acetate (EVA) foam, a polymer, a thermoplastic, a thermoset, a thermoplastic elastomer, an elastomer, a rubber, an expandable material, and compressed air.

These and other features, aspects, and advantages of the present teachings will become better understood with reference to the following description, examples, and appended claims.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

FIG. 15 shows a perspective view of a paddle having a gap, according to a representative example.

FIG. 16 shows a perspective view of a paddle with a first filler filling a gap, according to a representative example.

FIG. 38A shows a first view during formation of a paddle, according to a representative example.

FIG. 38B shows a second view during formation of a paddle, according to a representative example.

DETAILED DESCRIPTION

Figure 1A:
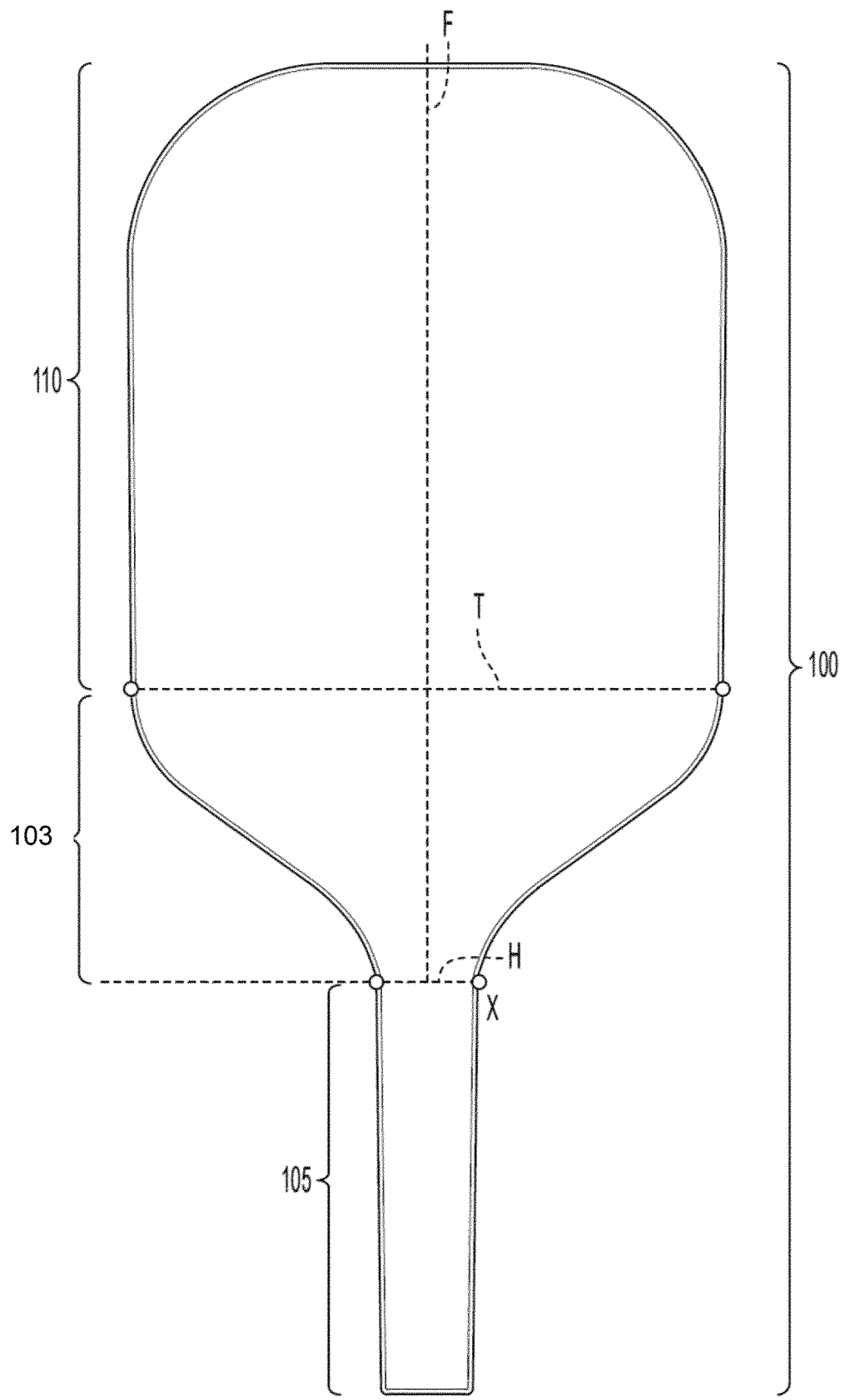
FIG. 1A shows a front view of a paddle, according to a representative example.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "about," "approximately," or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary. By way of example, the following description identifies a "first filler," a "second filler," a "third filler," and so forth—where it will be understood that the "first," "second", "third," etc., designations are used for convenient identification and potential differentiation from one another (e.g., when disposed in the same paddle), and—unless expressly described to the contrary or otherwise clear from the context—these terms are not otherwise limiting and do not have other meaning such as order of addition or similar. Further, unless expressly described to the contrary or otherwise clear from the context, any of the fillers described herein may be substituted with another filler.

In general, the devices, systems, kits, and methods disclosed herein relate to paddles such as pickleball paddles with one or more gaps formed in a core portion thereof that can accommodate one or more fillers, e.g., to provide vibration dampening and/or to otherwise affect performance, comfort, and enjoyment. It will be understood that, while this disclosure may emphasize the present teachings in the context of pickleball, the present teachings may be adapted and practiced in other sports and activities, including without limitation one or more of: tennis, badminton, squash, racquetball, table tennis (ping pong), and the like. Thus, it shall be understood that, unless expressly stated to the contrary, or otherwise clear from the context, the present teachings are intended to include comparable equipment in other sports/activities in addition to, or instead of, pickleball.

A paddle can be used to play games like pickleball, racquetball, paddleball, etc. The paddle may be solid, meaning that it is not made of string with holes between the string (such as a tennis racket). The paddle can have some foam (or other filler) on the inside alongside other material(s) such as core; the filler can serve to increase power, soften feel and reduce vibration.

In an example embodiment, the paddle can be made with a manufacturing process as follows. The process can begin with using an original paddle. The paddle has a front and back surface and a core on the inside, in a "sandwich structure." The front and back surfaces can be made from any material, such as one, two, three, four, or more layers of unidirectional or a weave of carbon, glass, and/or any natural or synthetic fiber and prepreg impregnated with any kind of resin. The core can be comprised of any open-cell structure and/or lattice (e.g., honeycomb) of, for example, polypropylene, aluminum, NOMEX, KEVLAR or another aramid, and/or any other synthetic or natural material.

The process then may core out (remove) a portion of the core. The portion of the core that is removed (gap) may depend on the embodiment—e.g., in different embodiments, different portions of the core can be cored out. The gap can be from 0.1 mm to 100 mm deep (from the edge to the center of the paddle). The process may then use a first filler (e.g., foam) to fill in the cored out portion (gap) of the core. In an example, instead of the first filler, the cored out portion (gap) can be left hollow.

The process may then insert a first filler (e.g., foam) into the gap. Note that the first filler can be a single material or a combination of at least two different materials. The process may then wrap a frame (such as a carbon frame) around the perimeter of the entire paddle. In an example, the frame can be an airtight hollow cuboid structure that has a second filler (e.g., foam) inside the frame. Note that, in an example, the frame may not be airtight. The second filler can be made from a single material or a combination of at least two different materials. In an alternate example, the frame can simply be a solid material wrapped around the perimeter. The second filler can be the same material(s) as the first filler or it can be a different material(s). In an example, the frame can be hollow. Note that a frame aspect ratio can be defined as the height of the frame divided by the width of the frame, and in an example, the frame aspect ratio would be lower than a predefined number (e.g., 4).

Figure 1B:
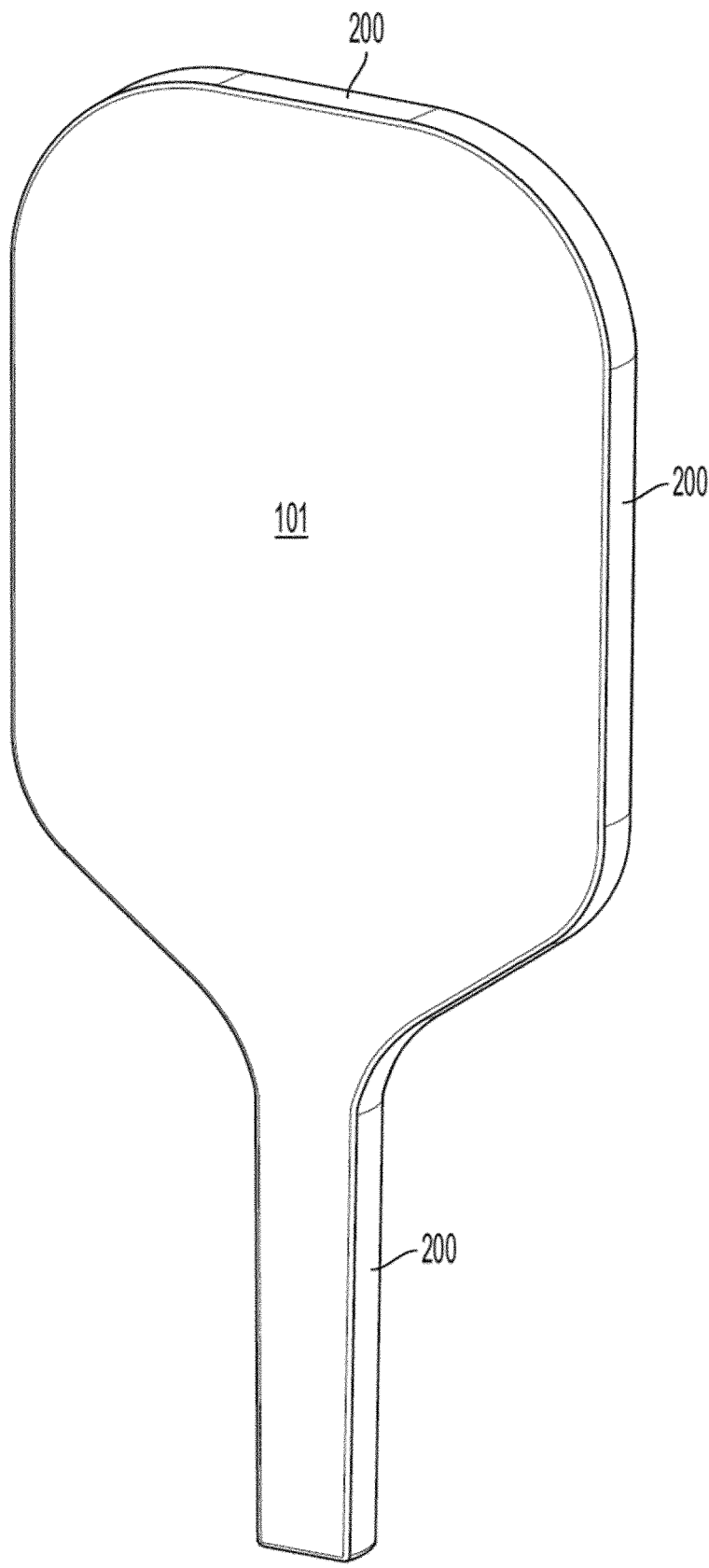
FIG. 1B shows a top perspective view of a paddle, according to a representative example.
Figure 1C:
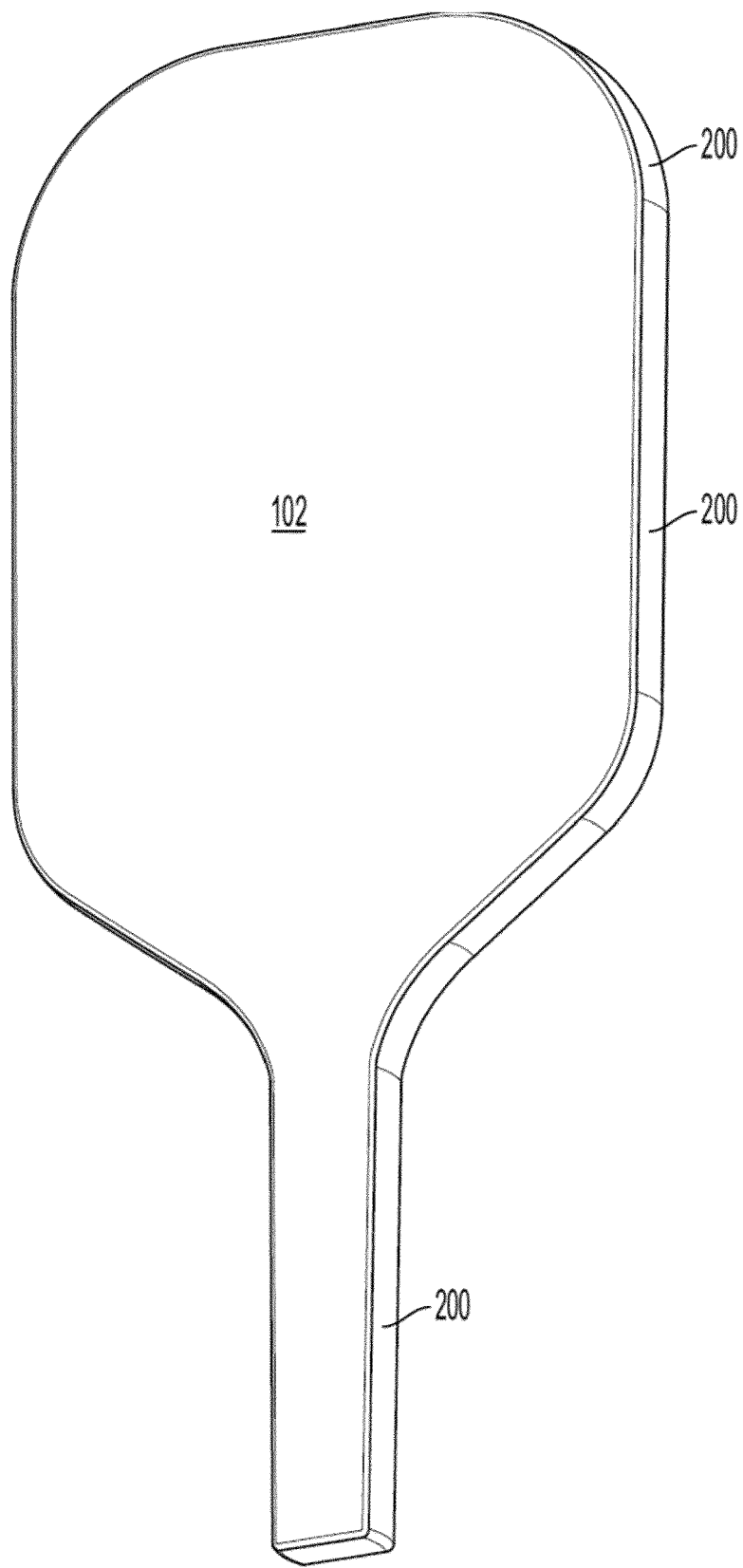
FIG. 1C shows a back perspective view of a paddle, according to a representative example.

FIG. 1A is a drawing showing a front view of a paddle 100, according to an example. The front view and back view may be identical. FIG. 1B is a drawing showing a top perspective view of the paddle, according to an example. FIG. 1C is a drawing showing a back perspective view of the paddle, according to an example. The paddle 100 may be utilized to create an improved paddle as described herein. Note that any paddles described herein are not limited to any particular shape, and any shape and/or thickness can be used. The front surface 101 and the back surface 102 can be made from any material, such as 1 to 4 or more layers of unidirectional or a weave of carbon, glass, and/or any natural or synthetic fiber and prepreg, impregnated with any kind of resin that is commonly used for the composite materials. Typically, the front surface 101 and the back surface 102 are made from the same material, although this is not required. A handle 105 is on the bottom of the paddle 100 and a head 110 is above the handle 105. Example dimensions for such a paddle can be as follows: 15-17 inches (38.10-43.18 cm) in length by 7-9 inches (17.78-22.86 cm) in width, or 16.5 inches (41.91 cm)×7.5 inches (19.05 cm) or 16 inches (40.64 cm)×8 inches (20.32 cm). Grip length may be: 4-6 inches (10.16-15.24 cm), or 4.75-5.75 inches (12.065-14.605 cm). Grip circumference may be: 4-4.5 inches (10.16-11.43 cm), or 4-4.3 inches (10.160-10.922 cm). It will be understood that the aforementioned dimensions are just examples and any other dimensions can be used.

Note that the handle 105 can be defined as the bottom of the paddle up until the point where the curvature of the perimeter of the paddle (without a grip) starts to change (e.g., a straight line starts to curve). This point is shown in FIG. 1A by the dotted line 'H'. The face of the paddle can be considered the rest of the paddle, that is, from the handle to the top of the paddle. The face can be broken up into two sections, the head 110 and the throat 103. The head 110 may be from the top of the paddle down to where the perimeter starts to curve (from a straight edge) which is shown in FIG. 1A by the dotted line 'T'. The throat 103 may be the region between the head and the handle. Thus, the face of the paddle may include only the head 110 and the throat 103 but not the handle 105. The height of the face is shown by the dotted line 'F' in FIG. 1A. All sections (e.g., head, throat, handle) are delineated by horizontal lines in FIG. 1A. These sections can be considered to extend throughout the thickness of the paddle.

An alternative method of determining the head and the throat sections is as follows. The height of the face may be determined by measuring the distance from the top of the paddle to where the handle begins (which can be determined based on when the curvature becomes straight, or by the use of a different material for the handle, etc.). The bottom one third of this height (e.g., the bottom one third of the face) may be the throat, and the top two thirds of this height (e.g., the top two thirds of the face) may be the head. As an example of this method, assume the height of the face (shown as vertical line F) in FIG. 1A is 10 inches (25.4 cm) from the top of the paddle to the top of the handle. The 10 inches does not include the handle. Then the throat cutoff line (shown as horizontal line T) is just at the lower one third of the face height, that is 3.33 inches (8.4582 cm) over the top of the handle is the throat (or 6.66 inches (16.9164 cm) below the top of the paddle). The region below the throat cutoff line and above the handle may be the throat region. While FIG. 1A is drawn as two-dimensional, the regions described herein may extend into the thickness of the paddle.

Figure 2:
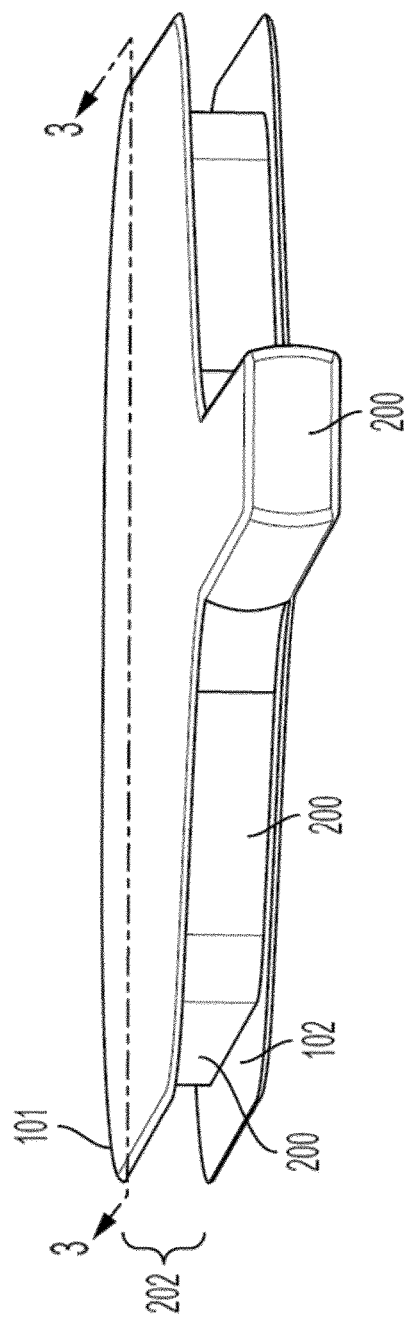
FIG. 2 shows a diagonal view of a paddle after being cored out, according to a representative example.

FIG. 2 is a diagonal view showing a paddle after it is cored out, according to an example. A core 200 may be present between the front surface 101 and the back surface 102. The core 200 can be comprised of any open-cell structure (or a plastic sheet closing the cells), lattice (e.g., honeycomb), and/or any other such structure, comprised of polypropylene, aluminum, NOMEX, KEVLAR, or any other synthetic or natural material. "Coring out" may include removing sections of the core 200 from the paddle 100. This can be done by using a drill or other tool which creates a gap 202 where the core 200 previously existed. See operation 3102 and its accompanying description for more information on an example coring out operation.

Figure 3:
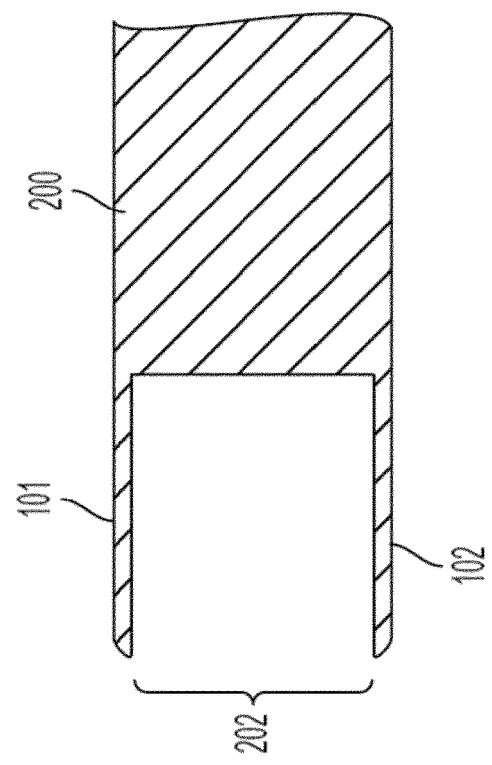
FIG. 3 is a cross section of FIG. 2.

FIG. 3 is a cross section of FIG. 2, according to an example. Between the top surface 101 and the bottom surface 102 is the gap 202. The gap 202 can be from 0.1 to 100 mm in depth (from the edge to the center of the paddle), it can be continuous around all the paddle, or split in two, three, four, or more sections of different lengths, depths, and shapes. The height of the gap can vary from 0.1 to 25 mm or to the max thickness of the core. The gap can be of any shape, concave, convex, U shape, or others.

Figure 4:
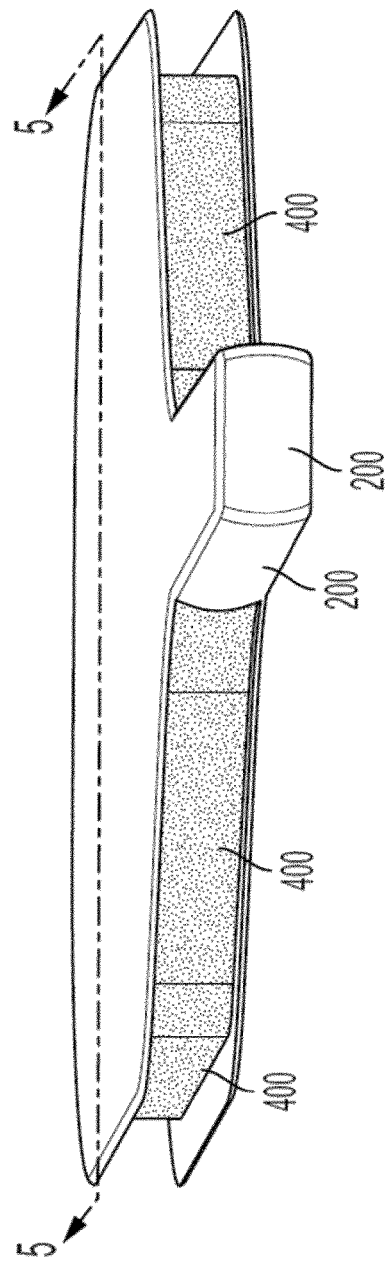
FIG. 4 shows a diagonal view of a paddle with foam added, according to a representative example.

FIG. 4 is a diagonal view of the paddle with foam added, according to an example. A first filler 400 may be added in the gap 202, although it may not completely fill the gap 202 as room can be left for a frame (e.g., carbon frame). The first filler 400 can be Ethyl Vinyl Acetate (EVA) foam, polymer, thermoplastic, thermoset, thermoplastic elastomer, elastomer, rubber, foam, expandable material, or a mixture of any combination of these. The first filler 400 can be of any density, viscosity, and hardness. See operation 3103 and its accompanying description for more information on how the filler may be applied.

The first filler 400 (and the gap 202 which it fills) can be of any cross-section shape; the height can vary from 0.1 to 25 mm or to the max thickness of the core; and the width (distance from the frame wall to the core) can vary from 0.1 to 50 mm. The first filler 400 can be continuous around all the core or can be split in two, three, or more sections with the same or different geometries, dimensions, and materials. The first filler 400 can surround the entire paddle, just the head, or just specific areas.

Figure 5:
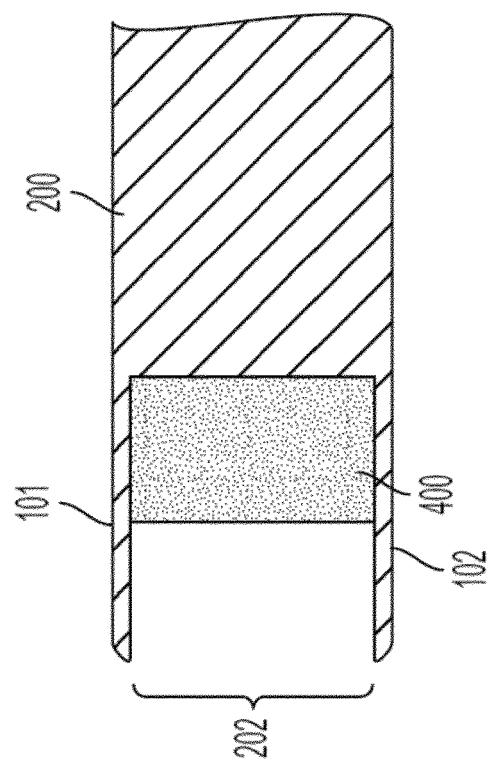
FIG. 5 is a cross section of FIG. 4.

FIG. 5 is a cross section of FIG. 4, according to an example. Shown inside the gap 202 is the first filler 400.

Figure 6A:
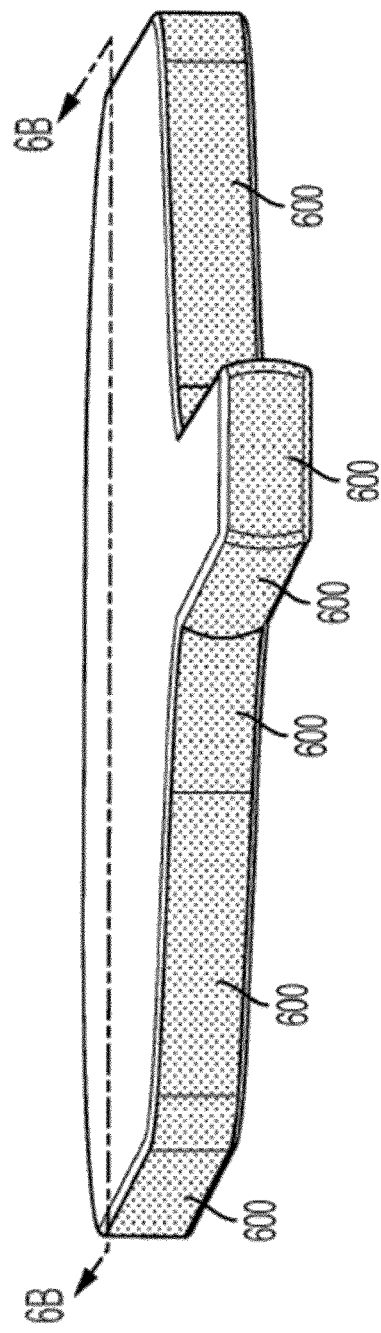
FIG. 6A shows a diagonal view of a paddle with a frame added, according to a representative example.

FIG. 6A is a diagonal view of a paddle with a frame added (such as a carbon frame), according to an example. A frame 600 may be added around the edge of the paddle 100. The frame 600 can be comprised of carbon, glass, and/or any synthetic or natural fiber with resin, plastic, rubber, metal, and/or any material that provides a rigid structure. The frame 600 can be of any cross-section shape, height, width, and length. It can be an entire piece or can be split into two, three, or more sections with same or different geometries and dimensions. The frame 600 can surround the entire paddle, just the head, just the handle, or just specific areas. See operation 3104 and its accompanying description for more information on how a frame may be applied. An edge guard (not pictured) can be optionally used (or not) to cover the frame and a small area of the surfaces on both sides.

Figure 6B:
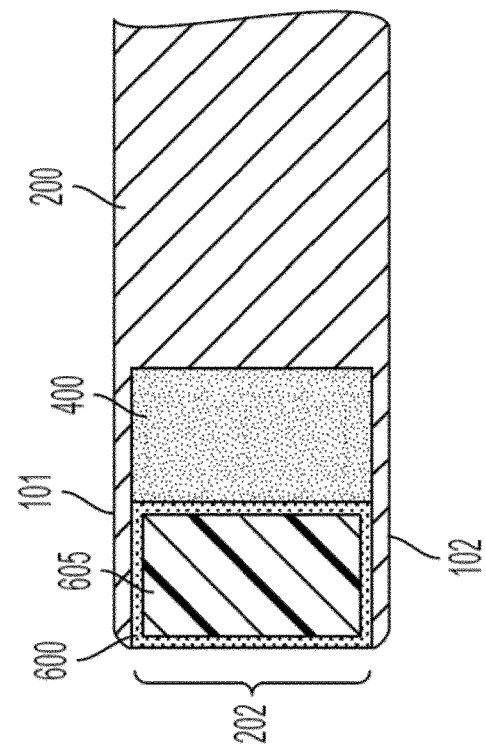
FIG. 6B is a cross section of FIG. 6A.

FIG. 6B is a cross section of FIG. 6A, according to an example. The frame 600 may be a hollow cuboid (or other) structure which houses a second filler 605. The second filler 605 can be polymer, thermoplastic, thermoset, thermoplastic elastomer, elastomer, rubber, foam, expandable material, or a mixture of any combination of these. The second filler 605 can be of any density, viscosity, and hardness, and can be a single material or combination of different materials. The second filler 605 can be the same material as the first filler 400 or it can be a different material. In certain embodiments, the second filler 605 can also be pressurized air (high pressure) since the frame 600 can be airtight or it can be hollow. Also shown is the core 200. When the frame is a shell structure as shown, the frame wall can range from 0.01-10 mm, 0.1-10 mm, 0.1-4 mm, or other ranges. Frame height may be 1-20 mm or to the max thickness of the paddle. Frame width can be 1-30 mm, or 5-15 mm. The frame can also be a solid structure (not shell structure); in this case, the examples of dimensions could be the same, but there's no wall thickness in this case.

Figure 7A:
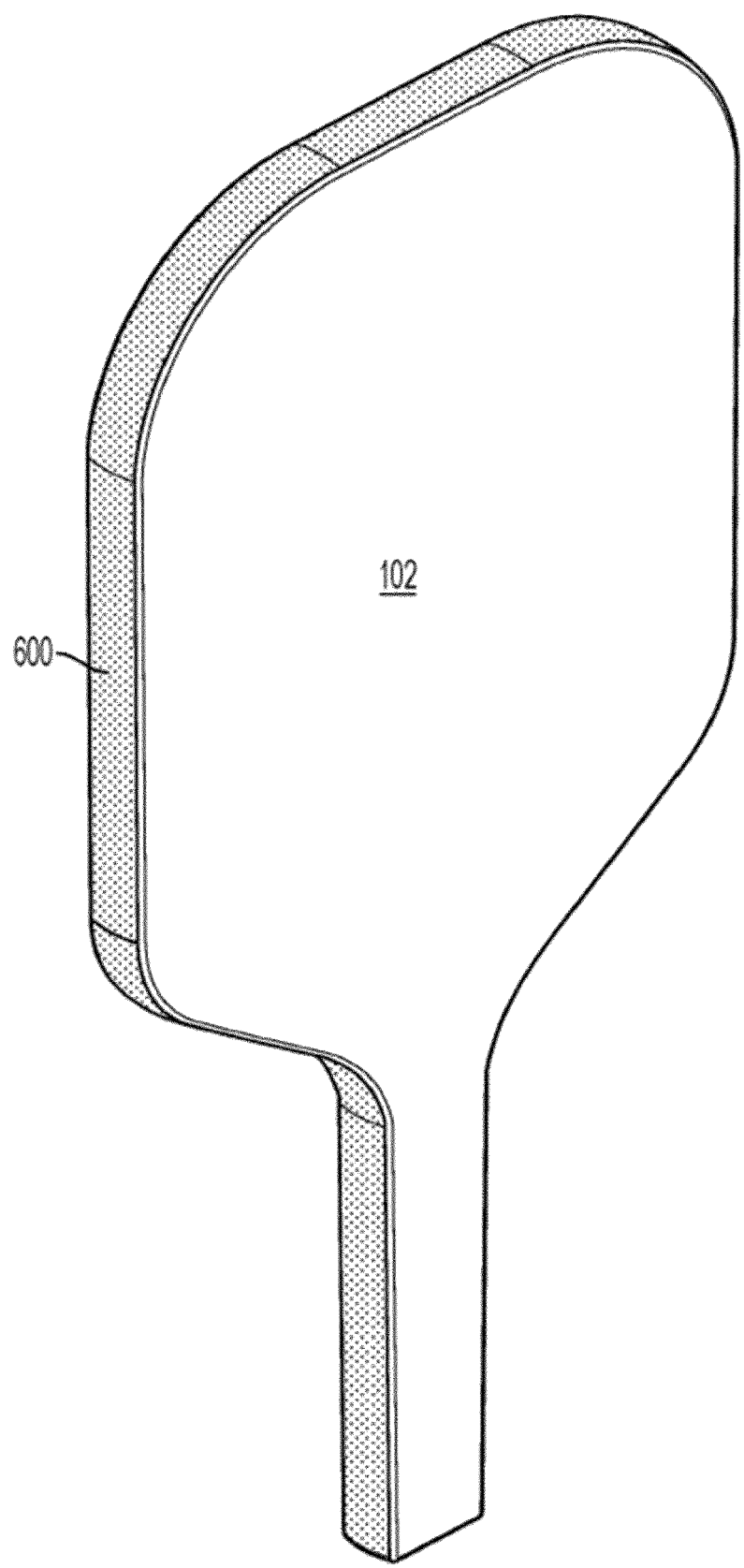
FIG. 7A shows a front perspective view of a paddle, according to a representative example.
Figure 7B:
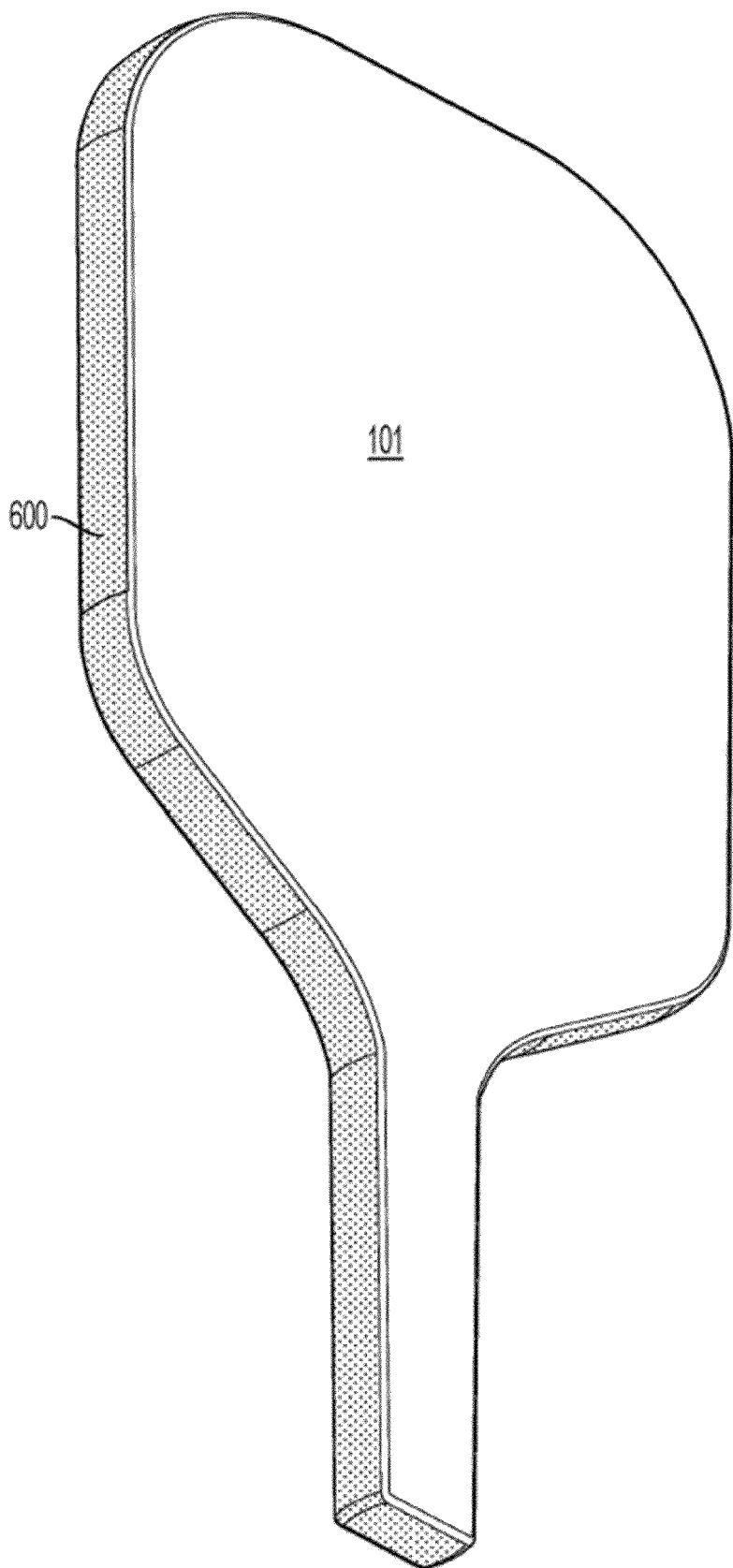
FIG. 7B shows a back perspective view of a paddle, according to a representative example.

FIG. 7A shows a front view of a paddle with a frame installed, according to an example. FIG. 7B shows a back view of the paddle with the frame installed, according to an example. The paddle shown in FIGS. 7A and 7B may be the final paddle after a manufacturing process is complete. The first filler 400 and the second filler 605 may not be visible to the user because they are internal to the paddle. Thus, the final paddle may appear like FIGS. 7A and 7B because the internal structure (e.g., core, first filler, second filler, etc.) may not be visible. In other example embodiments, one or more of these internal structures may be visible, however.

Figure 7C:
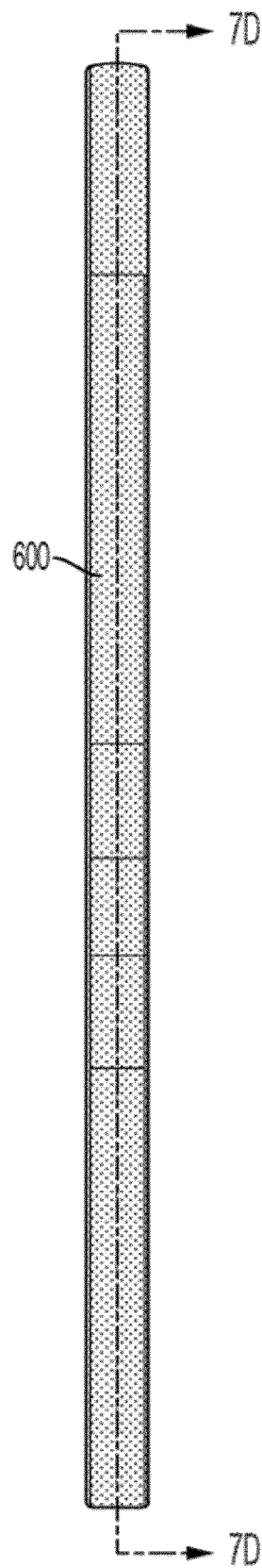
FIG. 7C shows a side view of a paddle, according to a representative example.
Figure 7D:
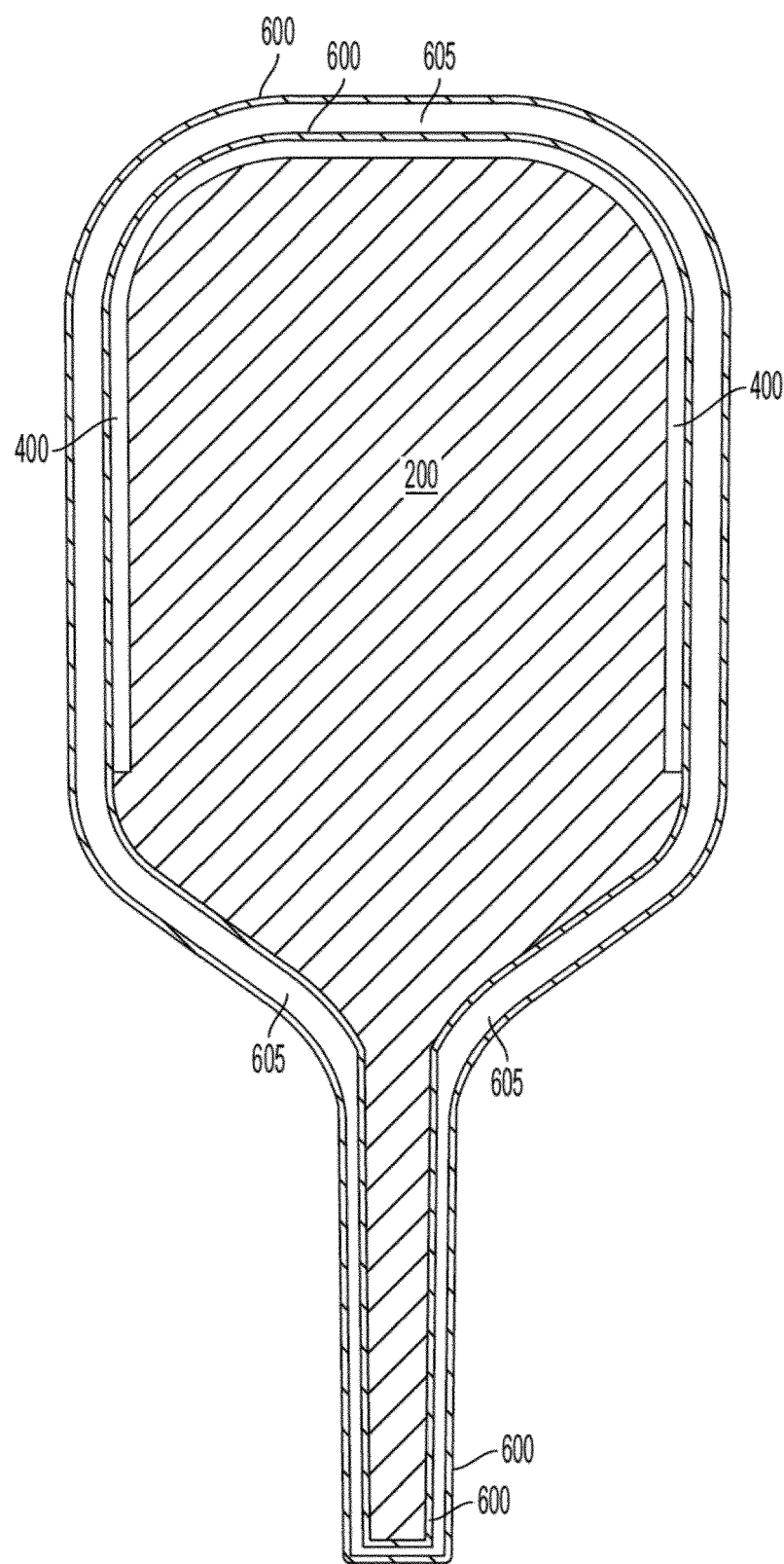
FIG. 7D shows a cross section of a paddle, according to a representative example.

FIG. 7C shows a side view of a paddle, according to an example. FIG. 7D shows a cross section shown in FIG. 7C, according to an example. Shown is the frame 600 with the second filler 605 inside the frame 600. The first filler 400 may be present inside the core 200 which fills the gap 202 previously made in the core 200.

Figure 7E:
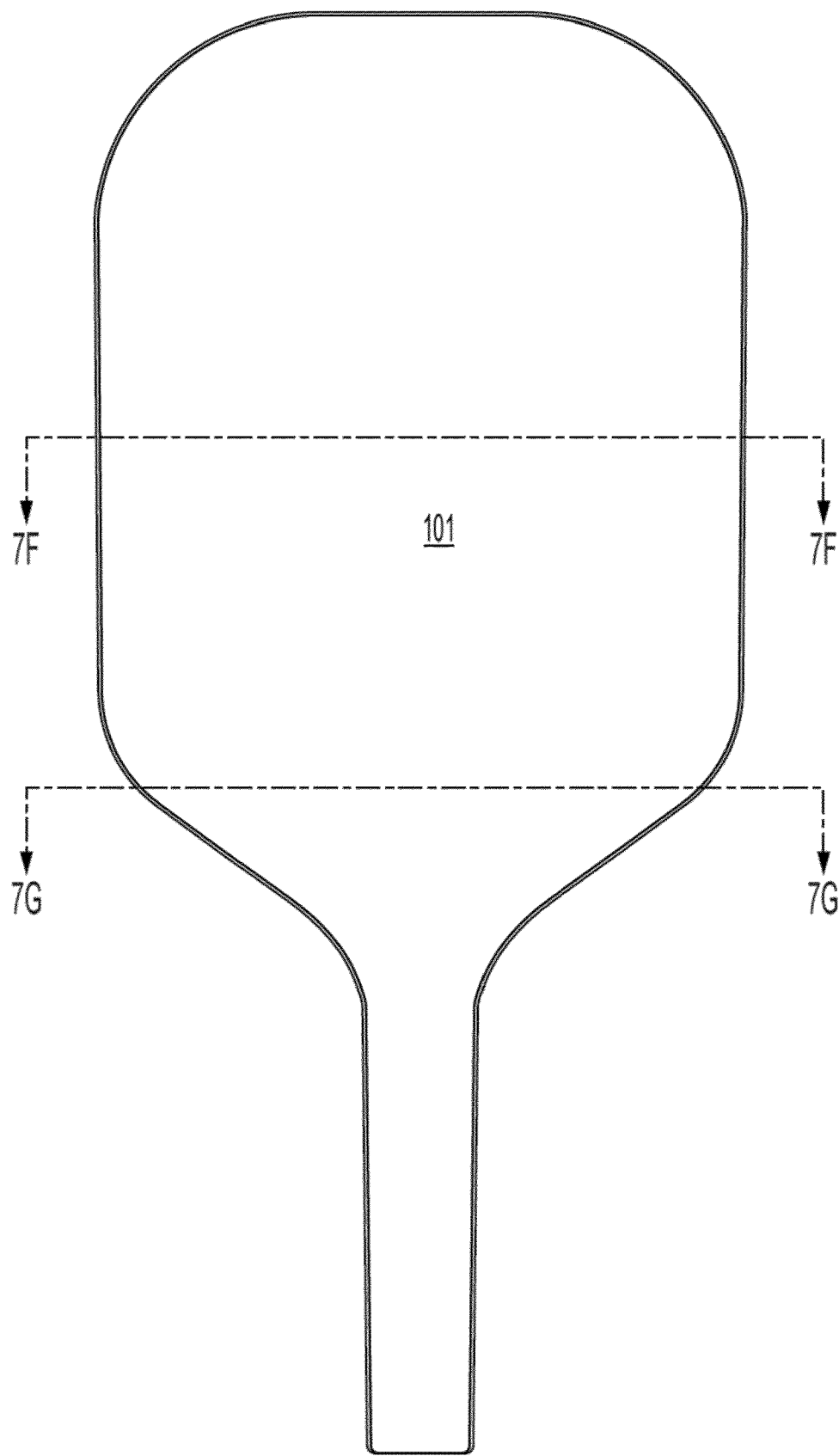
FIG. 7E shows a front view of a paddle, according to a representative example.
Figure 7F:
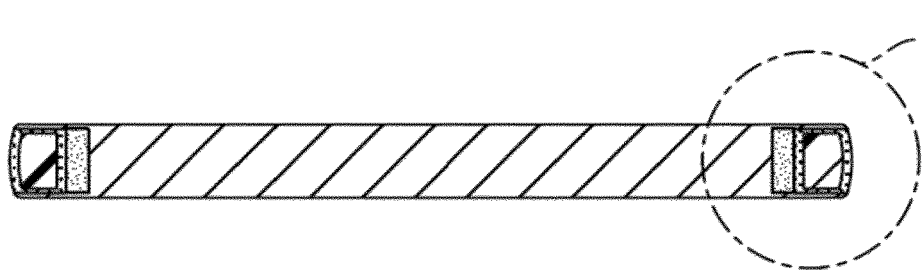
FIG. 7F shows a cross section from Section 7F-7F shown in FIG. 7E.
Figure 7G:
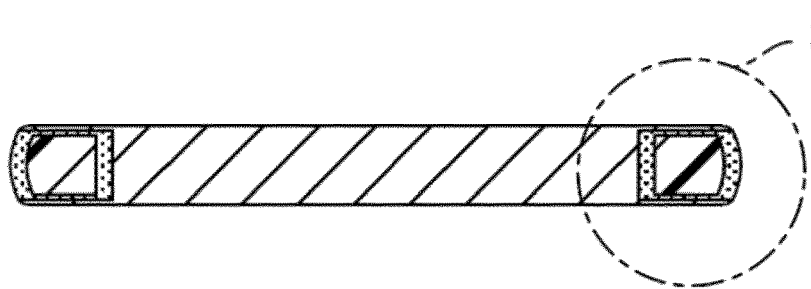
FIG. 7G shows a cross section from Section 7G-7G shown in FIG. 7E.
Figure 7H:
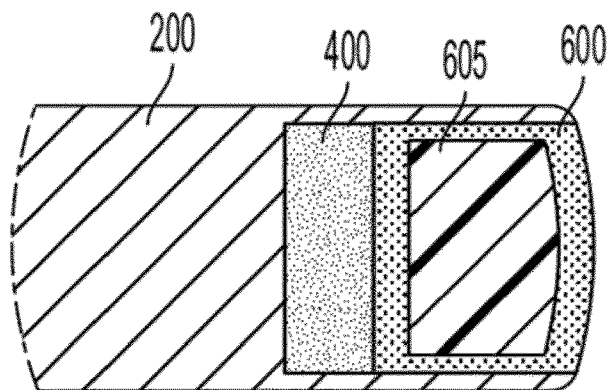
FIG. 7H shows a detailed view of the area circled in FIG. 7F.
Figure 7I:
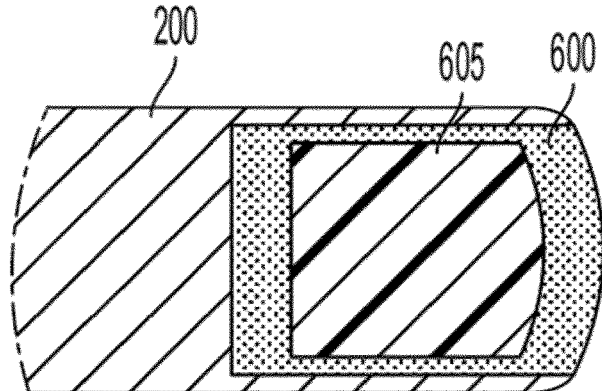
FIG. 7I shows a detailed view of the area circled in FIG. 7G.

FIG. 7E shows a front view of a paddle, according to an example. The back view of the final paddle may be identical to the front view. Note that the frame may surround the entire paddle. In an example, the frame does not surround the entire paddle but only a portion of it; for example, the frame may only surround a part of the head of the paddle, or just part of the handle, etc. FIG. 7F shows a cross section from the Section 7F-7F shown in FIG. 7E, according to an example. FIG. 7G shows a cross section from the Section 7G-7G shown in FIG. 7E, according to an example. Note that in FIG. 7G there may be no first filler 400 (as shown in FIG. 7F) because the portion of the paddle shown in FIG. 7G may not have been cored out and hence no first filler 400 was applied to that region. FIG. 7H shows a detailed view of the area circled in FIG. 7F, according to an example. Note that FIG. 7H shows a height and width of the frame. The frame aspect ratio is the height/width. In one example, the frame aspect ratio may be smaller than 4 (or smaller than equal to 4). In another example, the frame aspect ratio may be smaller than 6, or smaller than 4, or smaller than 2, or other numbers. FIG. 7I shows a detailed view of the area circled in FIG. 7G, according to an example.

FIGS. 8-13 are each drawings showing a front view of a paddle, according to various examples. Note that the back view of each paddle may be identical to the respective front view. All other structures not shown may be the same or similar as described herein. In each of these figures, the first filler is shown which may be inside the respective paddle and may not be visible to the user. Before the first filler is added, as described herein. The section where the first filler is shown may have been cored out (the gap). All of these examples may also have a frame (e.g., with the second filler inside the frame) applied around the entire edge. Thus, the embodiments shown in FIGS. 8-13 can be constructed using a process described herein, and can have the same general structure as shown in FIGS. 2-7I but for the different location and shape of the gap which was cored out of the original paddle and filled with the first filler. Note that other configurations of core and first filler can be used as well, and these are just examples. Note that in FIGS. 8-13, the first filler and the second filler may both not be visible to the user as they may both be embedded inside the paddle (e.g., the first filler being inside the game and the second filler being inside the frame). The paddles shown in FIGS. 8-13 may appear as shown in FIGS. 7A and 7B because any internal structures (e.g., first filler 400, second filler second filler 605, core 200, etc.) may not be visible as it would be covered by the front and back surfaces and possibly the frame 600.

In the example shown in FIGS. 7D and 8-13, the gap and filler used to fill the gap may be located near the perimeter of the head (the head being opposite of the handle) of the paddle. In a further example, the gap and filler used to fill the gap can be in other locations in the paddle (not just near the perimeter), although typically closer to the handle than the head. FIGS. 14-18 illustrate examples of a paddle where the gap and filler used to fill the gap are present in various locations inside the paddle. Note that the construction process can be the same as shown with respect to FIGS. 1-13.

Figure 14:
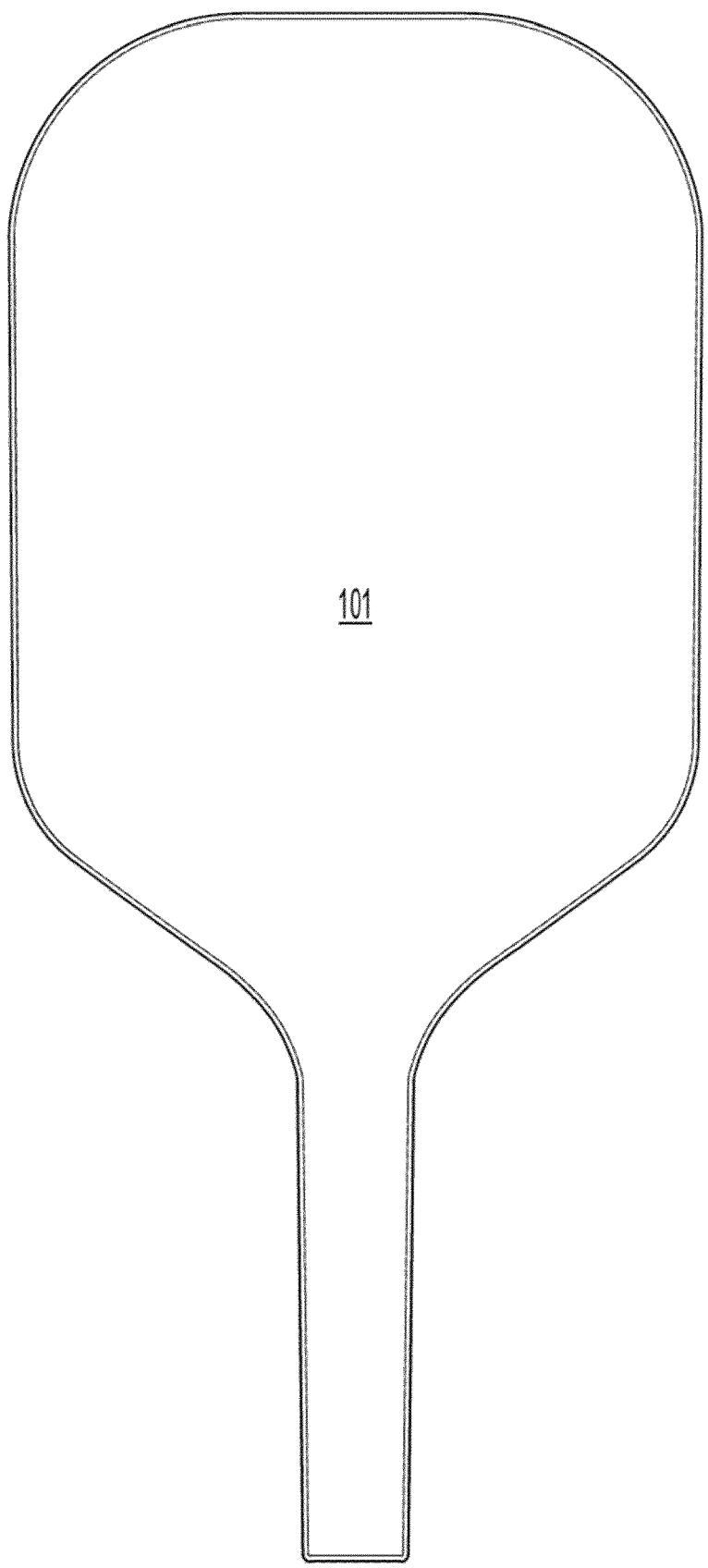
FIG. 14 shows a front view of a paddle, according to a representative example.

FIG. 14 is a front view showing a paddle before it is cored out, according to an example. FIGS. 15-19 show a process of how a dampener may be applied to a paddle. Note that the core may be present throughout the paddle (as shown in other figures) and may be surrounded by a front and back surface. The outer surfaces can be comprised of one, two, three, four, or more layers of unidirectional or weave of carbon, glass, and/or any natural or synthetic fiber and prepreg, impregnated with any kind of resin. The core 200 can be comprised of a honeycomb structure of polypropylene, aluminum, Nomex, Kevlar, and/or any other synthetic or natural material. The core is not limited to a honeycomb structure. The core can form the entire paddle (head and handle) or the head only. The core can be surrounded by an edge guard, or any type of frame, or it may be edgeless.

Figure 19:
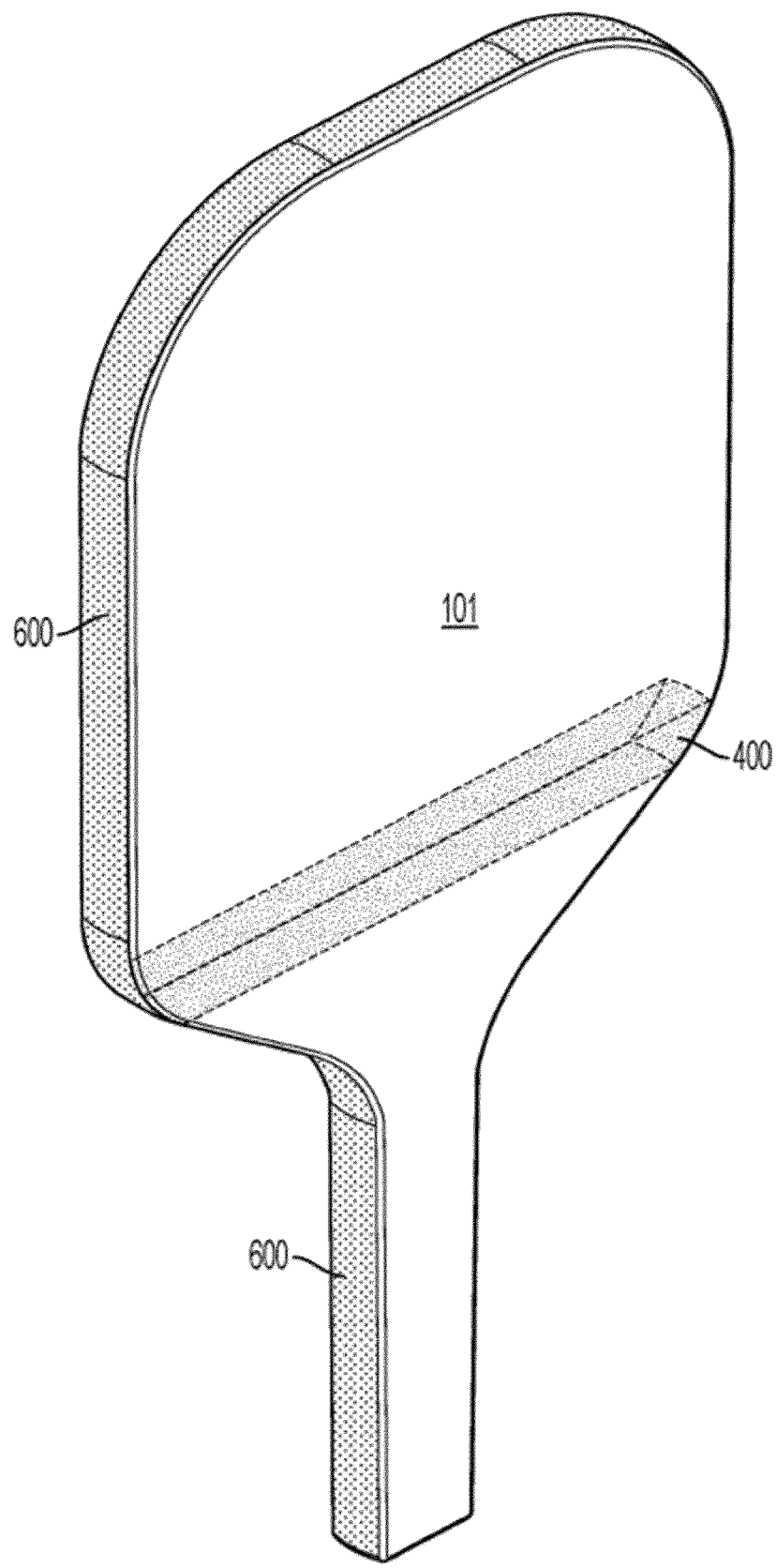
FIG. 19 shows a perspective view of a paddle with filler on the inside, according to a representative example.

FIG. 15 is a perspective view showing the paddle from FIG. 14 after it was cored out, according to an example. Note that a gap 1500 in the core 1400 may be where the core 1400 was drilled (or other process) to form the gap 1500. Note that the gap 1500 may be near the handle 1501. FIG. 16 is a perspective view showing a first filler filling in the gap (as described herein), according to an example. The gap 1500 (and hence the first filler) may extend throughout the entire paddle. Note that the gap 1500 may extend throughout the paddle and out through the opposite side of the paddle. While the gap 1500 extends throughout the paddle, the paddle does not collapse into two sections because the front and back surface keep the paddle together until the first filler is inserted to fill the gap 1500. Because the gap is typically smaller than the total thickness of the paddle, leaving some part of the original core, which also helps the paddle to not collapse. FIG. 19 shows the first filler 1600 extending throughout the paddle.

The gap 1500 may be used to place a vibration dampener (e.g., the first filler) but can also be hollow partially or completely filled. The gap can be of any dimension, cross section, shape, and any position, it can be continuous across the paddle, or split into two, three, four, or more sections of different lengths, widths, and shapes. It can be linear or curved, in the center of the paddle and/or along the edges. The gap can be inside the sandwich structure and/or reach/pass the front and back surfaces. It can be on the head (edges, center, top, bottom), neck, and/or handle of the paddle. Multiple gaps can be used simultaneously in the same or different parts of the paddle. If the gap is located in the edges of the paddle, it can be exposed to the outside (on both edges of the paddle), or it can be covered with a frame, edge guard, or any other material or structure.

The gap 1500 may be filled with a first filler 1600. The first filler can be a foam, polymeric foam, solid, liquid, gel of any type of polymer, thermoplastic, thermoset, thermoplastic elastomer, elastomer, rubber, expandable material, and any other material or a mixture of them. The first filler can fill completely or partially the gap 1500. The first filler can be directly touching the core structure, or it can be covered/encapsulated by other material, for example a thermoplastic film or carbon fiber, not limited to these materials. If the gap 1500 reaches the surface, the first filler 1600 can be exposed on the surface or can be covered with glass fiber, carbon fiber, adhesive or any other material.

Figure 17:
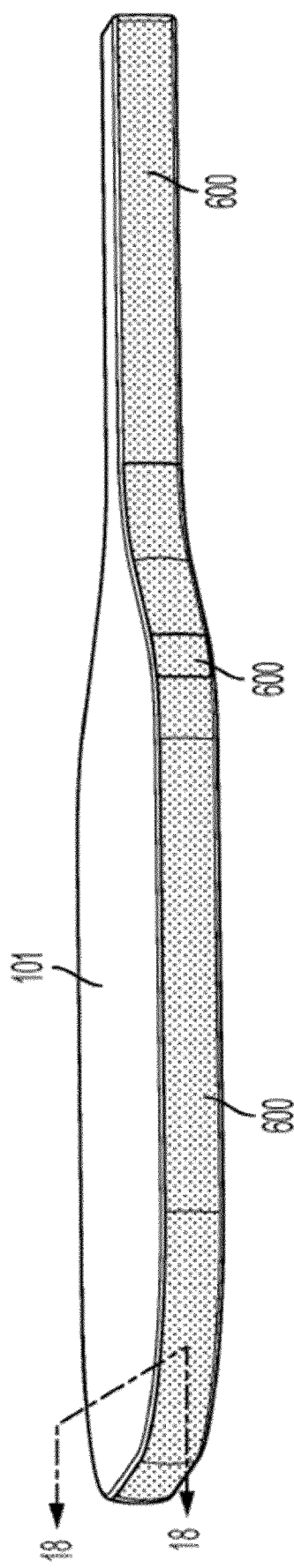
FIG. 17 shows a perspective view of a paddle with a frame added to the edge of the paddle, according to a representative example.

FIG. 17 is a perspective view showing a frame added to the edge of the paddle from FIG. 16, according to an example. After the gap 1500 is filled with the first filler 1600, a frame 1700 can be added to the edge (perimeter) as described herein. Note that in some examples, where there is no gap on the edge of the paddle, adding the frame may not be done. The frame 1700 can have a second filler as described herein. Note that the final paddle may appear as shown in FIGS. 7A and 7B.

Figure 18:
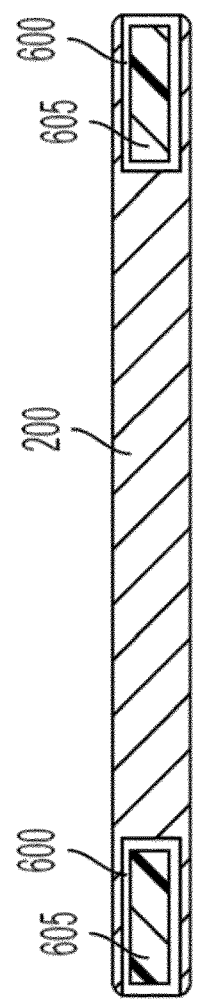
FIG. 18 is a cross section of FIG. 17 showing the core, first filler, and frame, according to a representative example.

FIG. 18 is a cross section of FIG. 17 showing the core, foam, and carbon frame, according to an example. The frame 1700 may contain a second filler 1800. FIG. 19 is a perspective view showing a front of a paddle showing the first filler on the inside, according to an example. The first filler 1600 may be inside the gap 1500 cut inside the core 1400. The first filler 1600 may not be visible to the user as it can be entirely inside the paddle; in other examples, the first filler 1600 may be visible to a user.

FIGS. 19-22 are each drawings showing a diagonal front view of a paddle, according to various examples. Note that the back view of each paddle may be identical to the respective front view. All other structures not shown may be the same or similar as described herein. The paddles shown in FIGS. 19-22 can be constructed as described herein.

Figure 20:
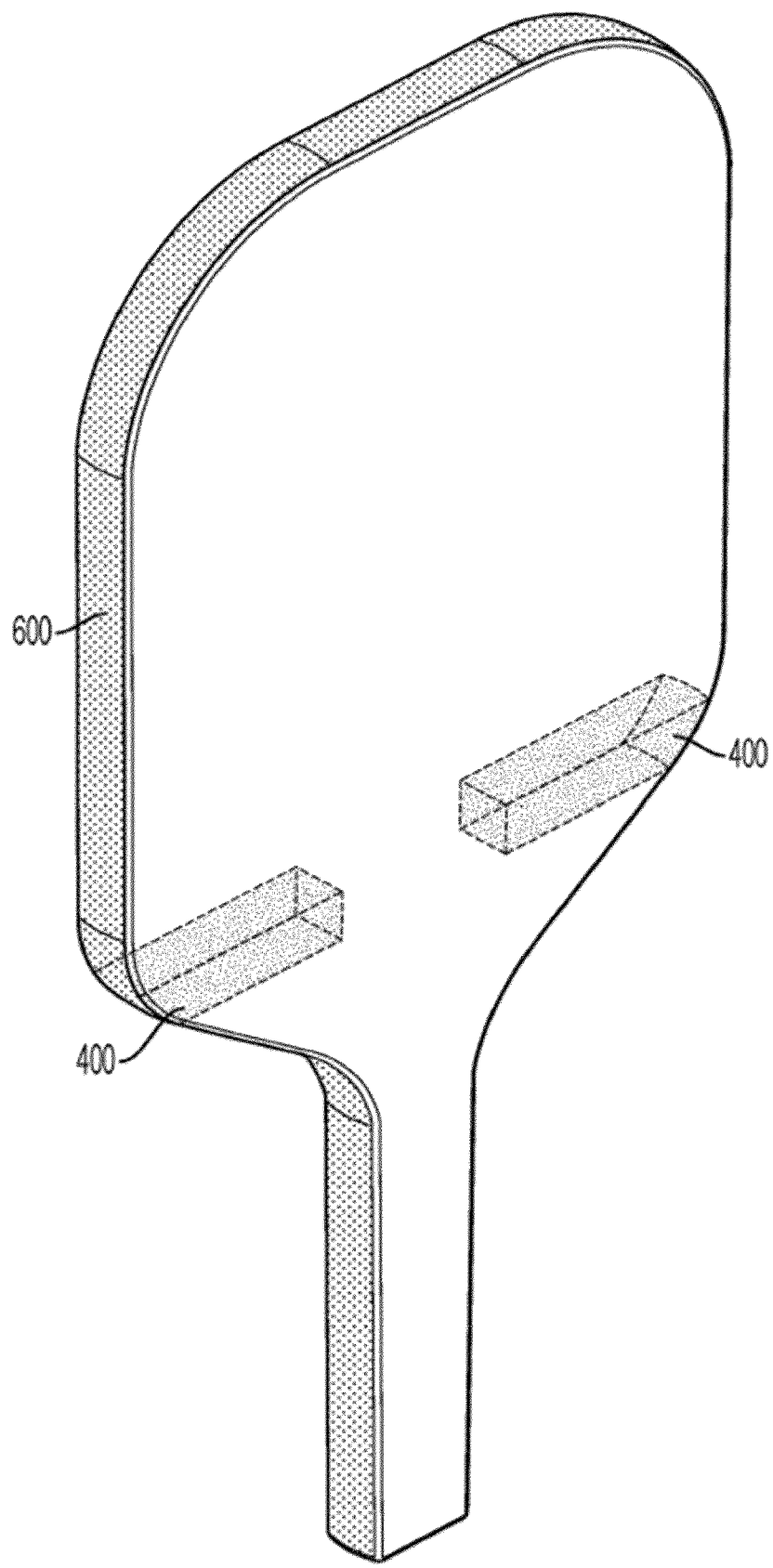
FIG. 20 shows a perspective view of a paddle with filler on the inside, according to a representative example.
Figure 21:
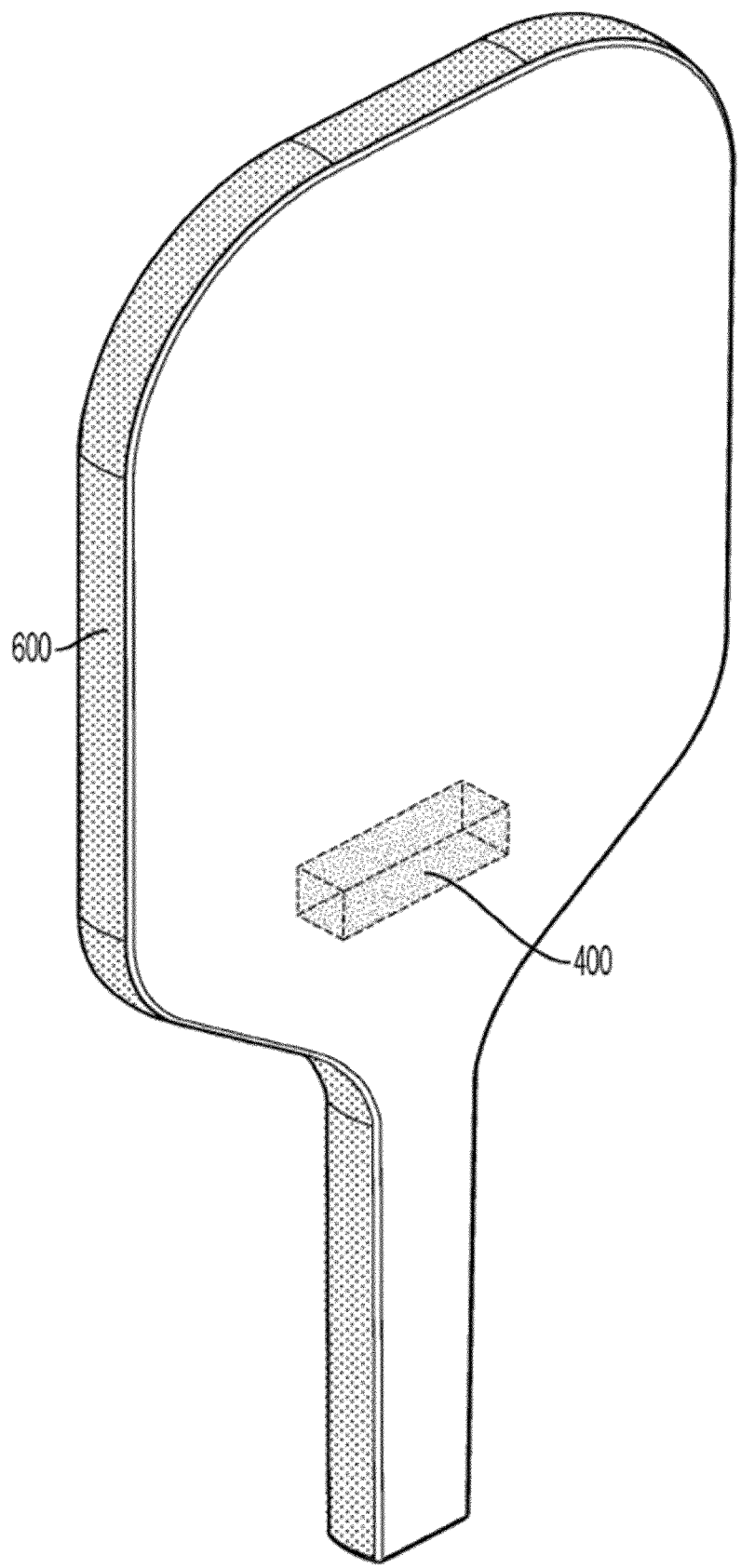
FIG. 21 shows a perspective view of a paddle with filler on the inside, according to a representative example.

FIG. 19 is an example of a paddle showing a horizontal gap (and first filler) across the entire paddle, and this may represent what was shown being constructed in FIGS. 15-18. FIG. 20 is an example of a paddle showing a horizontal gap (and first filler) in the sides of the paddle. FIG. 21 is an example of a paddle showing a horizontal gap (and first filler) in the center of the paddle. The gap (and first filler) is not limited to these examples or to horizontal gaps, and other shapes, dimensions, and configurations can be used also or instead. Note in FIGS. 19-21, the first filler may or may not be completely inside the paddle, and thus may or may not be visible to the user. The second filler may also or instead be completely inside the paddle (inside the frame) and may not be visible to the user, or it may be visible in some aspects.

Note that when the gap and first filler are entirely in-between the head and the handle (the throat), it can be referred to as a dampener (such as shown in FIGS. 19-21). In other words, a dampener may not have any portion of filler outside of the throat of the paddle (e.g., above the throat line or below the top of the handle). Note that when the gap and the first filler is near the perimeter/edges of the paddle (such as shown in FIGS. 7D and 8-13), then it can affect properties of the paddle, which can for example increase spin and boost of a ball striking the paddle. This can be because the first filler (e.g., foam) inside the paddle, in an example, can slightly vibrate when the paddle strikes a ball, which enhances the feel for the player when striking the ball. A dampener can reduce vibration on the handle. Note that in an example, a dampener can be considered a piece of foam that is entirely inside the throat of the paddle. Note that in an example, using the frame can be optional. In one example, if a paddle contains a dampener, then there would not be a frame used.

Note that the ratio of volume of first filler to volume of the core can be relatively large (meaning there is a relatively large amount of first filler used in the paddle). For example, in a particular paddle, a ratio r is equal to the volume of all first filler divided by the volume of all core. In an example, the ratio r can be 5%. In another embodiment, r can be from 5% to 75%. In another example, r can be from 25% to 50%. In another embodiment, r can be from 10% to 20%. In an example, an acceptable range of r would be from 1% to 30%.

Figure 8:
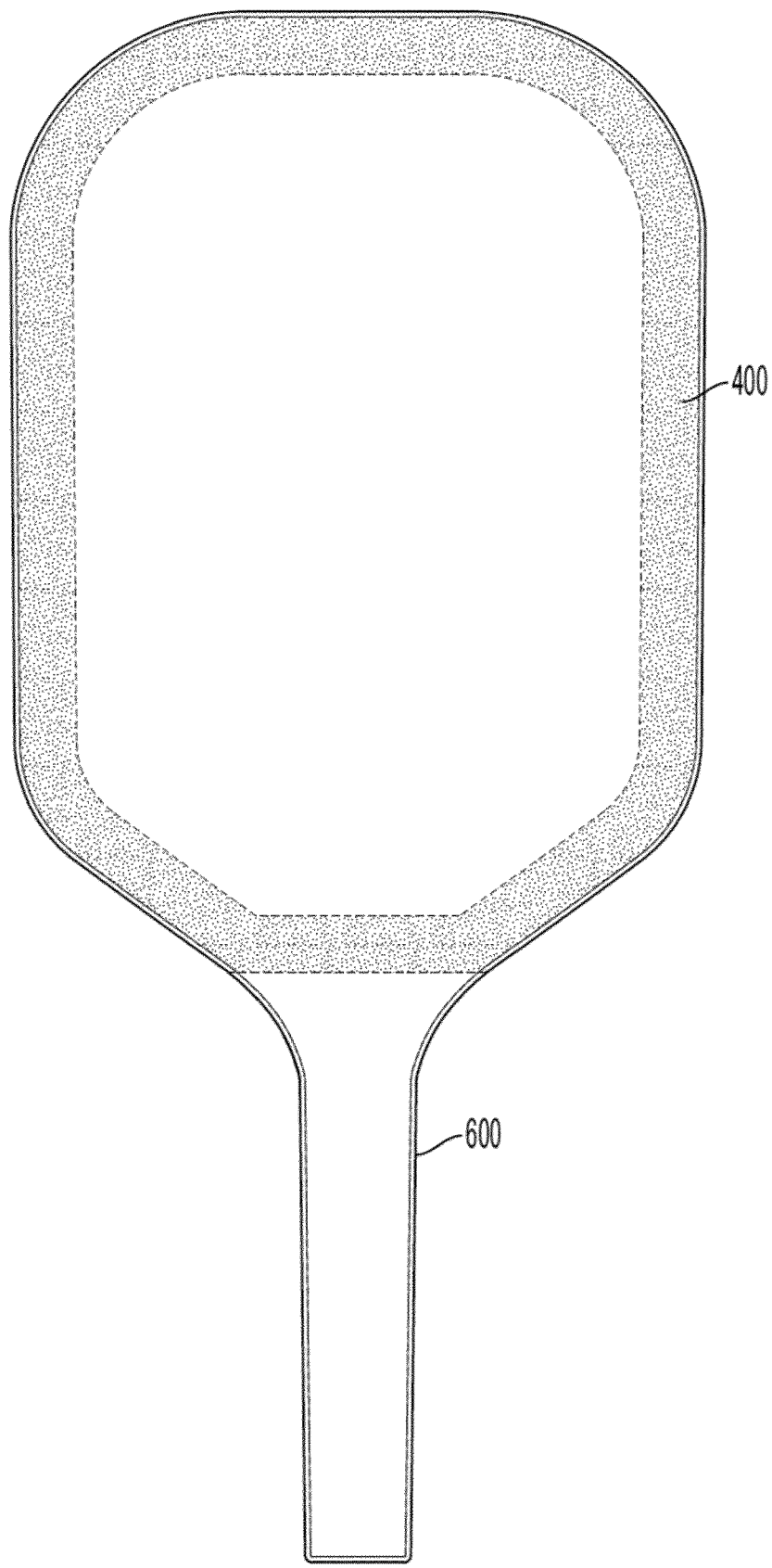
FIG. 8 shows a front view of a paddle, according to a representative example.
Figure 9:
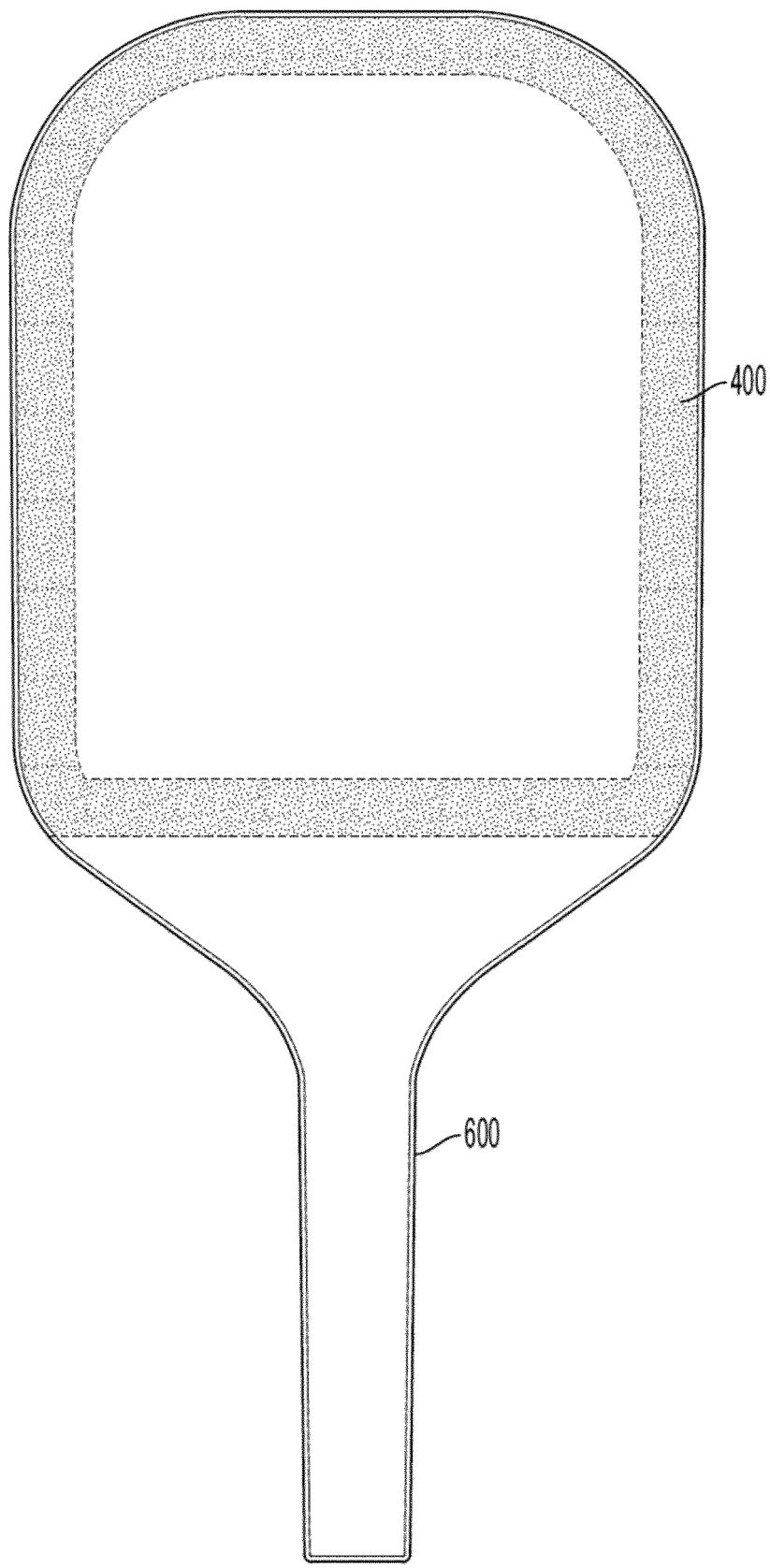
FIG. 9 shows a front view of a paddle, according to a representative example.
Figure 10:
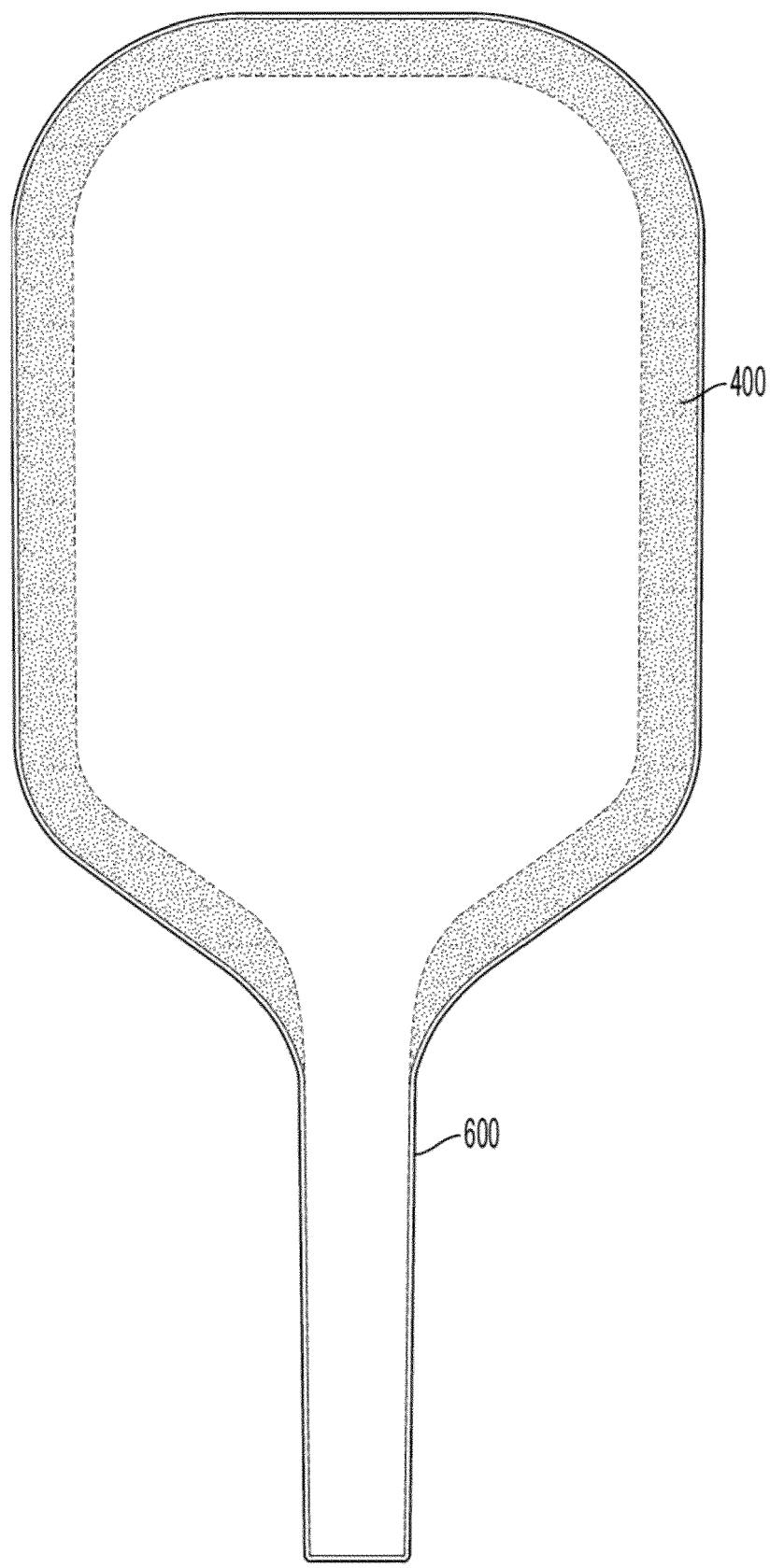
FIG. 10 shows a front view of a paddle, according to a representative example.
Figure 11:
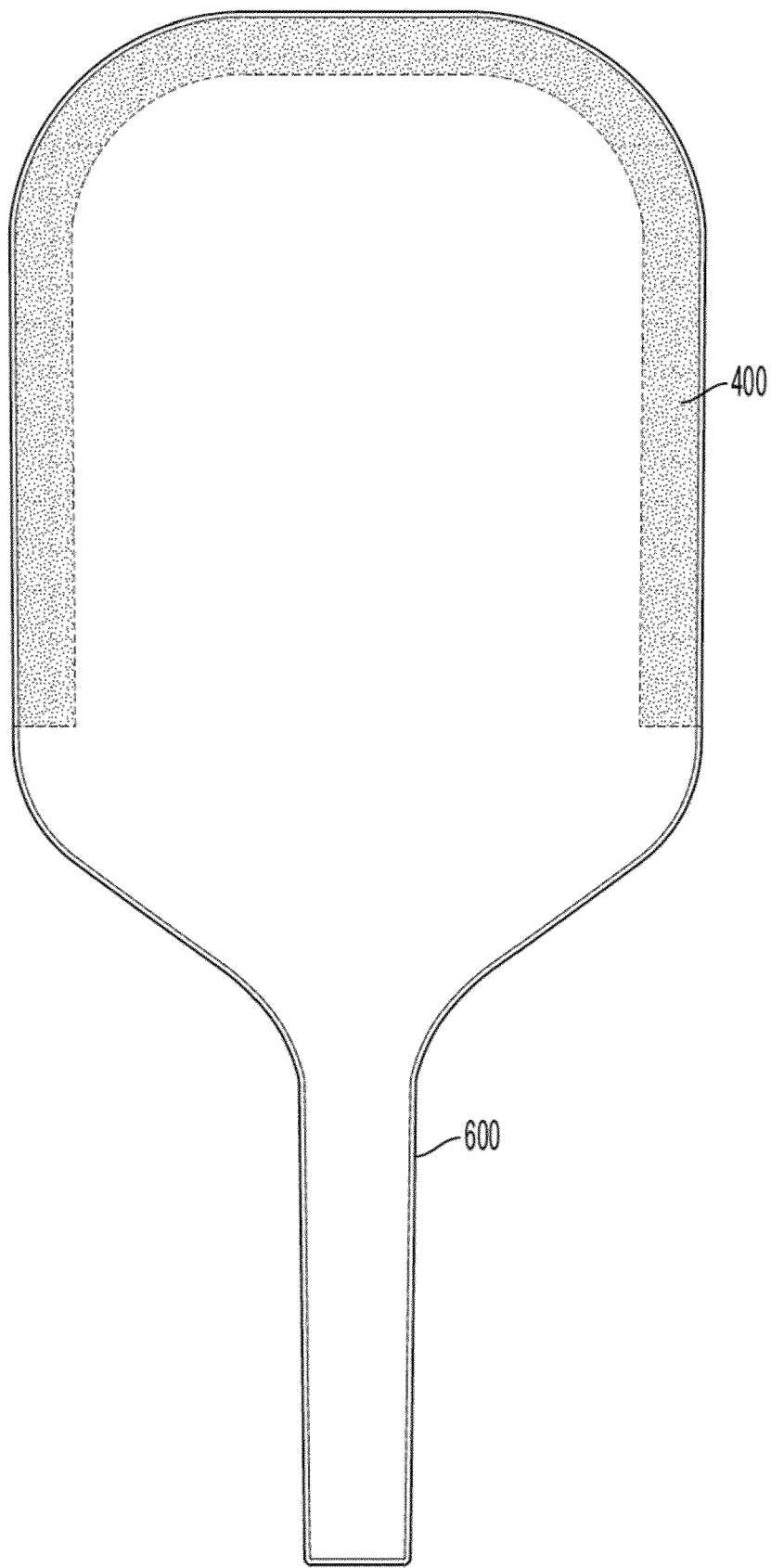
FIG. 11 shows a front view of a paddle, according to a representative example.
Figure 12:
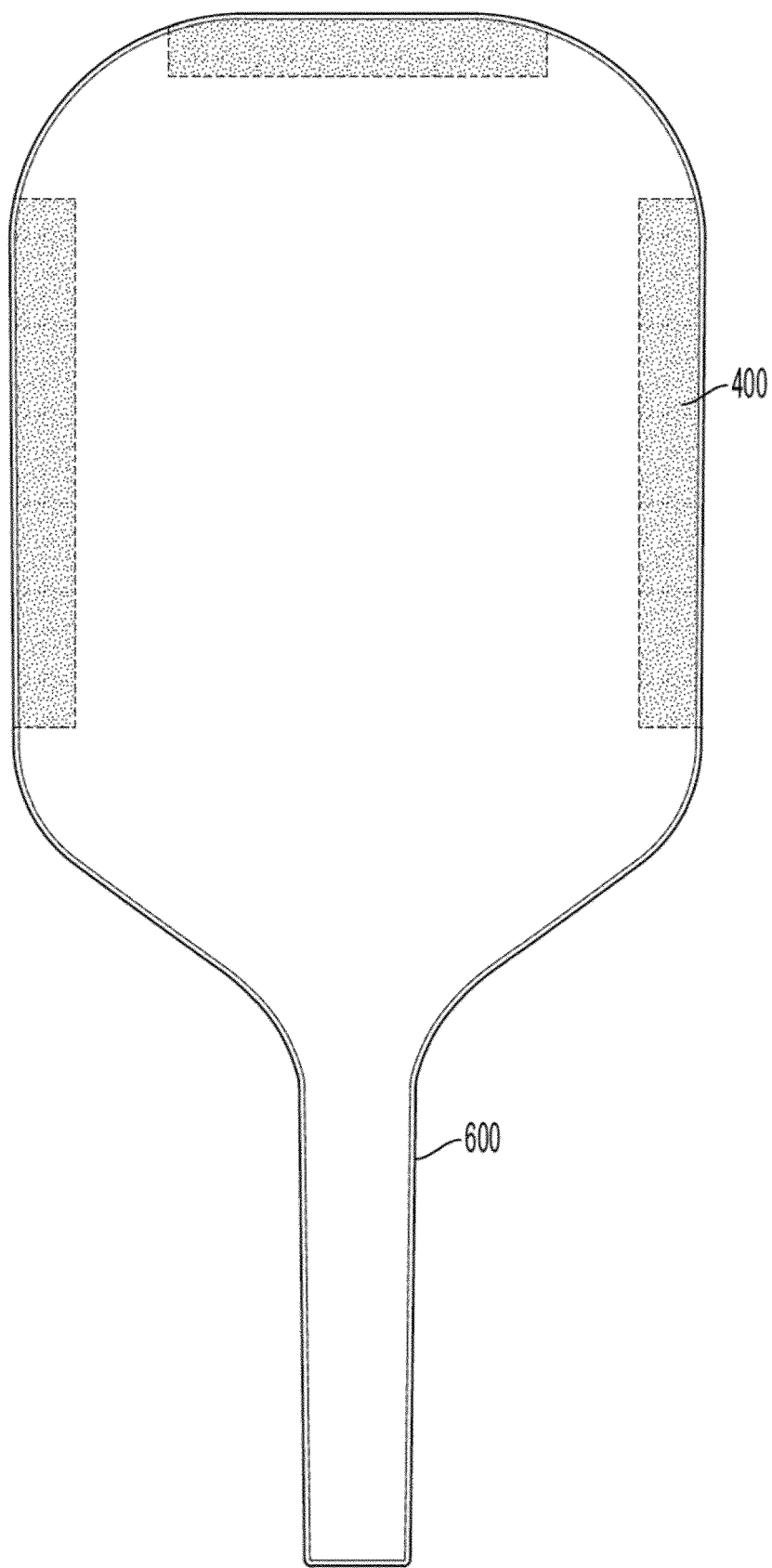
FIG. 12 shows a front view of a paddle, according to a representative example.
Figure 13:
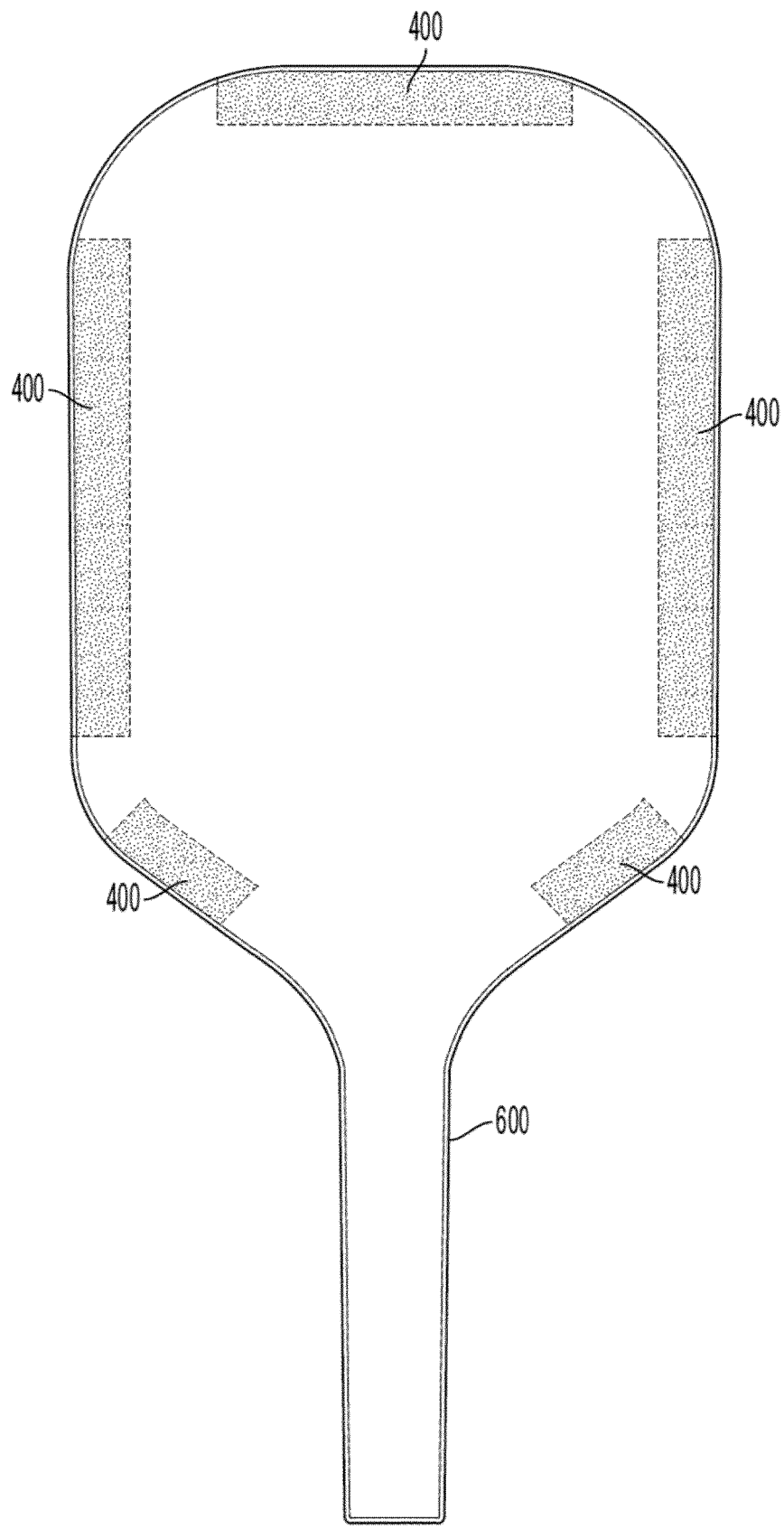
FIG. 13 shows a front view of a paddle, according to a representative example.
Figure 22:
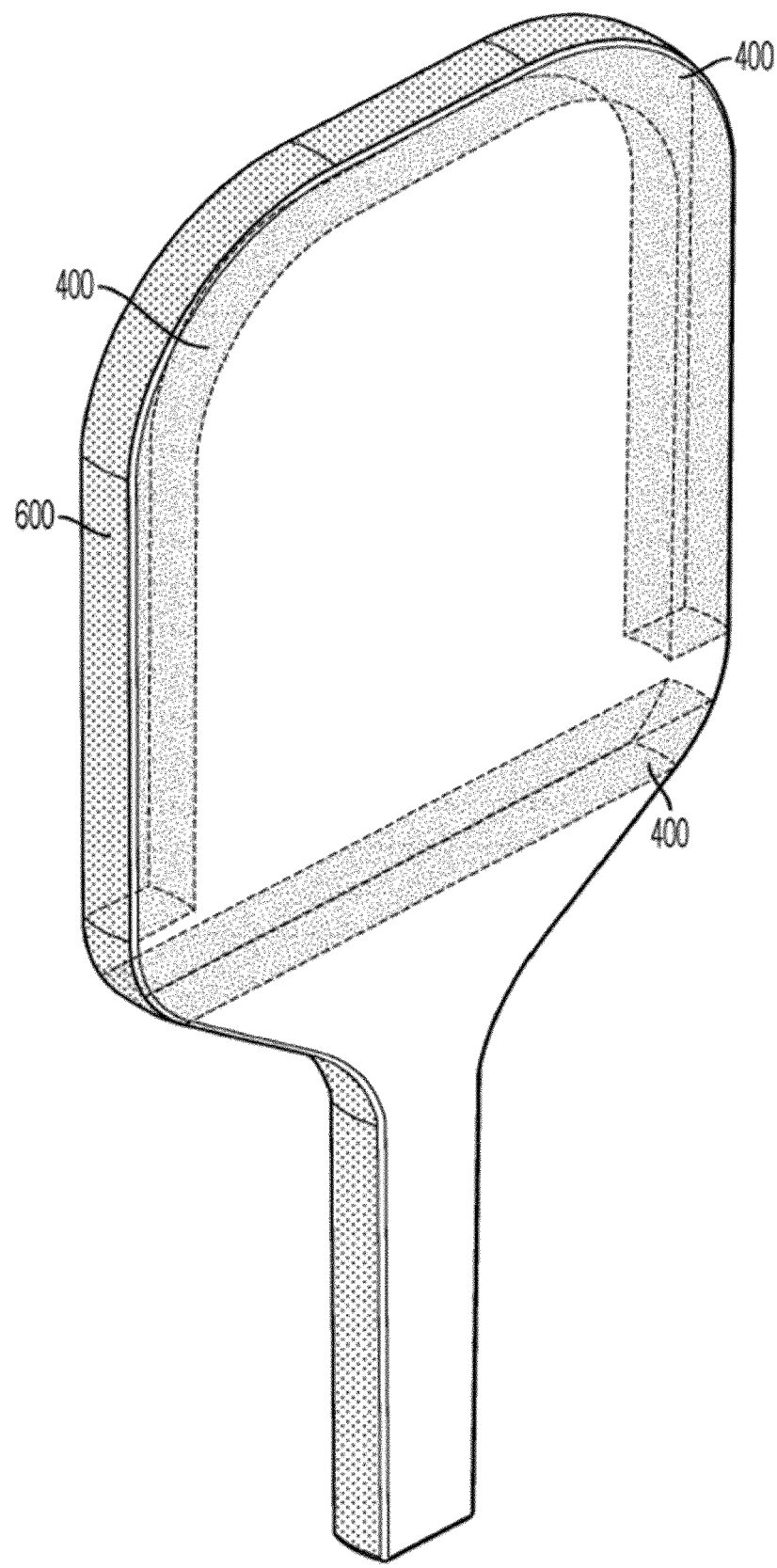
FIG. 22 shows a perspective view of a paddle with filler on the inside, according to a representative example.

Note that both a dampener (e.g., gap with filler between the head and the handle) and gap with filler near the edge can be combined into the same paddle, see FIGS. 8, 9, 22. FIG. 22 is a perspective view showing a front of another alternative paddle showing first filler both around the perimeter as well as throughout a section between the head and the handle, according to an example.

Figure 23:
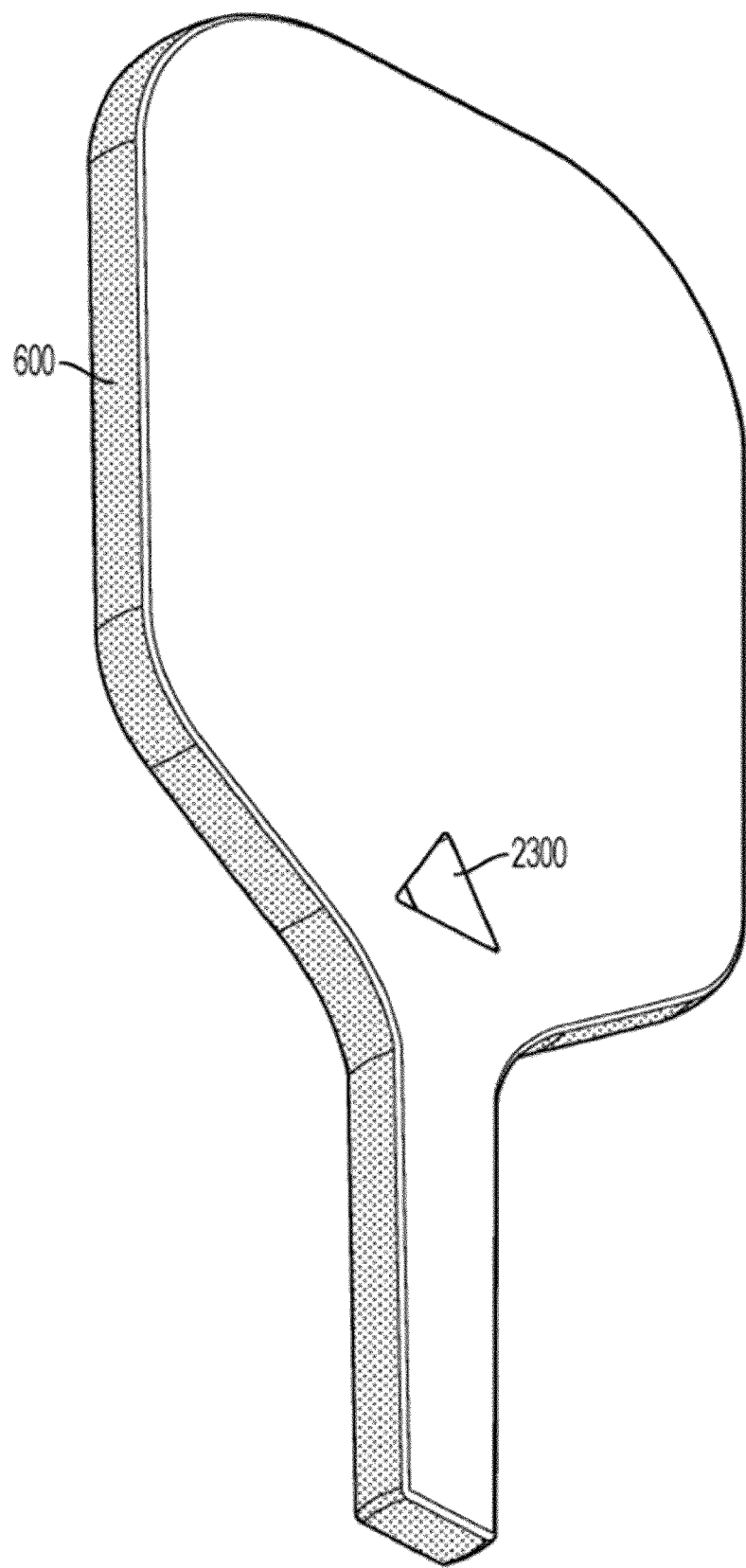
FIG. 23 shows a perspective view of a paddle with a gap in the throat, according to a representative example.

FIG. 23 is a perspective view of a paddle with a gap cut through the front and back surfaces, according to an example. Note in this embodiment, a gap 2300 may be cut throughout the core, front, and back surface of the paddle.

Figure 24:
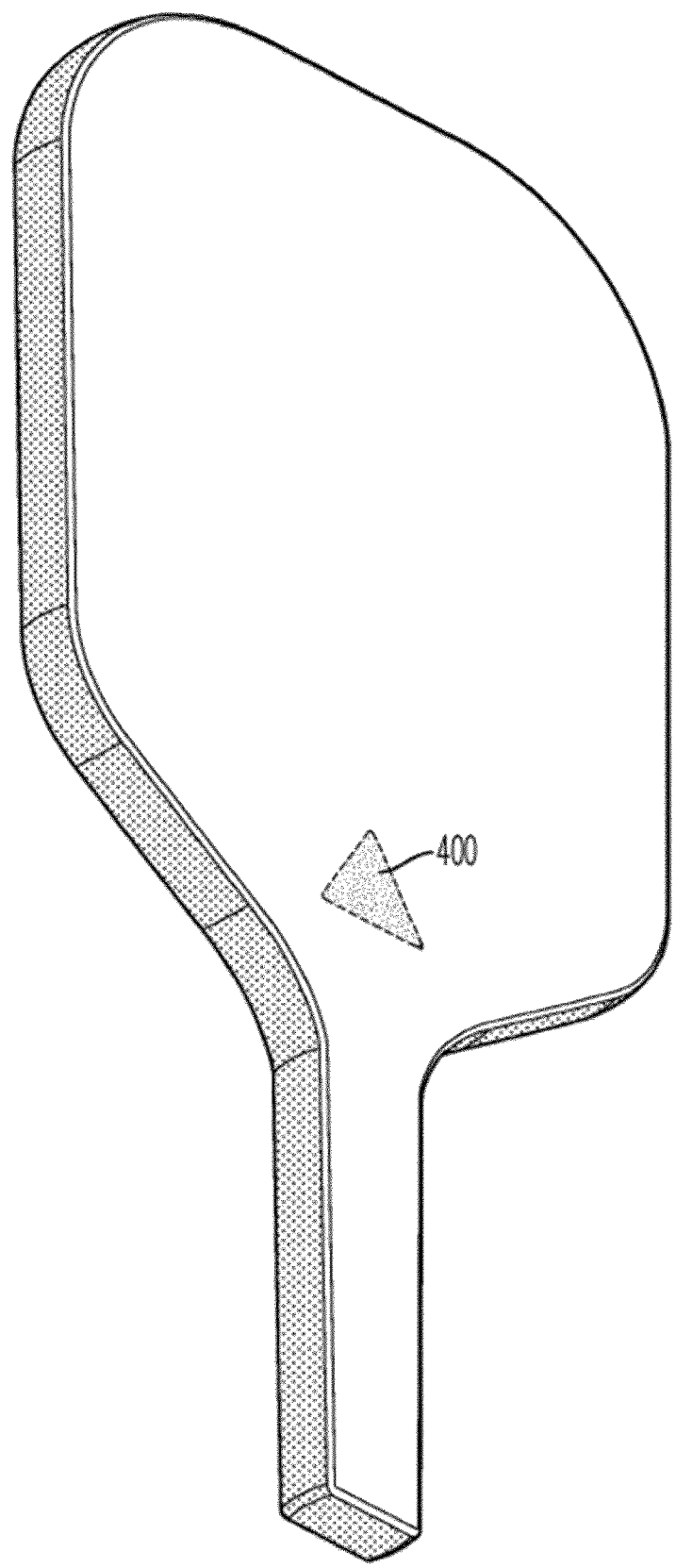
FIG. 24 shows a perspective view of a paddle with filler in the throat, according to a representative example.

FIG. 24 is a perspective view of a paddle with the gap cut through the front and back surfaces with filler, according to an example. A first filler 2400 may be inserted into the gap 2300. The front surface and back surface can then be coated with an external coating (but alternatively could be visible without any coating/cover), such as a carbon fiber layer, to cover the entire front and back surface including the first filler 2400. As such, the first filler 2400 may or may not be visible to a user after the external coating is applied. FIGS. 17, 19-22, and 24 may all appear visually as FIGS. 7A and 7B, e.g., with all of the internal structures (e.g., core 200, first filler 400, second filler 605, etc.) covered by the front and back surfaces and possible a frame 600.

Figure 25:
FIG. 25 shows a left side view of a paddle, according to a representative example.
Figure 26:
FIG. 26 shows a right side view of a paddle, according to a representative example.
Figure 27:
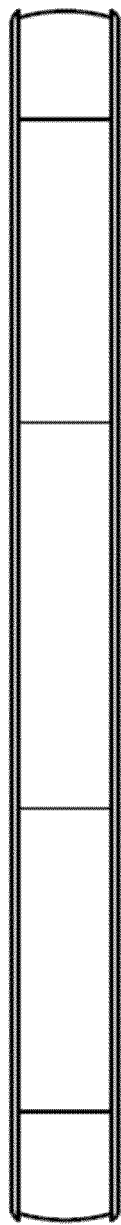
FIG. 27 shows a top view of a paddle, according to a representative example.
Figure 28:
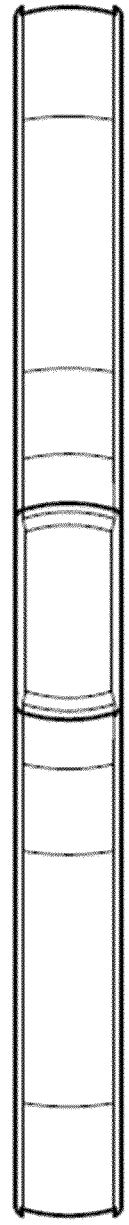
FIG. 28 shows a bottom view of a paddle, according to a representative example.

FIG. 25 is a left side view of a paddle, according to an example. FIG. 26 is a right side view of the paddle, according to an example. FIG. 27 is a top view of a paddle, according to an example. FIG. 28 is a bottom view of a paddle, according to an example. Note that a completed (finished) paddle can appear on the outside as shown in FIGS. 7A and 7B as well as FIGS. 25-28. Note that the surfaces shown in FIGS. 25-28 may be all frame 600 although the shading does not match the shading used in the other figures with regard to the frame 600 in order to show contours.

Figure 29:
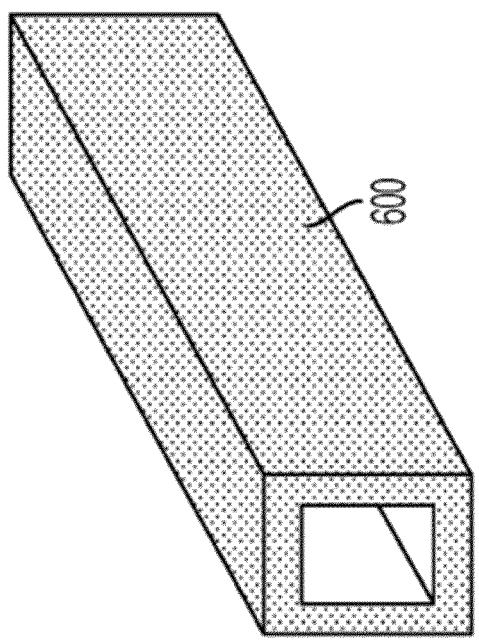
FIG. 29 shows a perspective view of a frame for a paddle, according to a representative example.

FIG. 29 is a drawing showing a perspective view of the frame, according to an example. Shown is the frame which can be made out of carbon or other material. The frame (before curing/heating) is malleable so it can be bent around the perimeter of the paddle. It can be glued onto the edge of the paddle using glue or other adhesive. While shown with an open face in FIG. 29, the face can be closed (sealed) on both ends, thereby creating an airtight frame in which pressurized air or other materials can be sealed therein.

Figure 30:
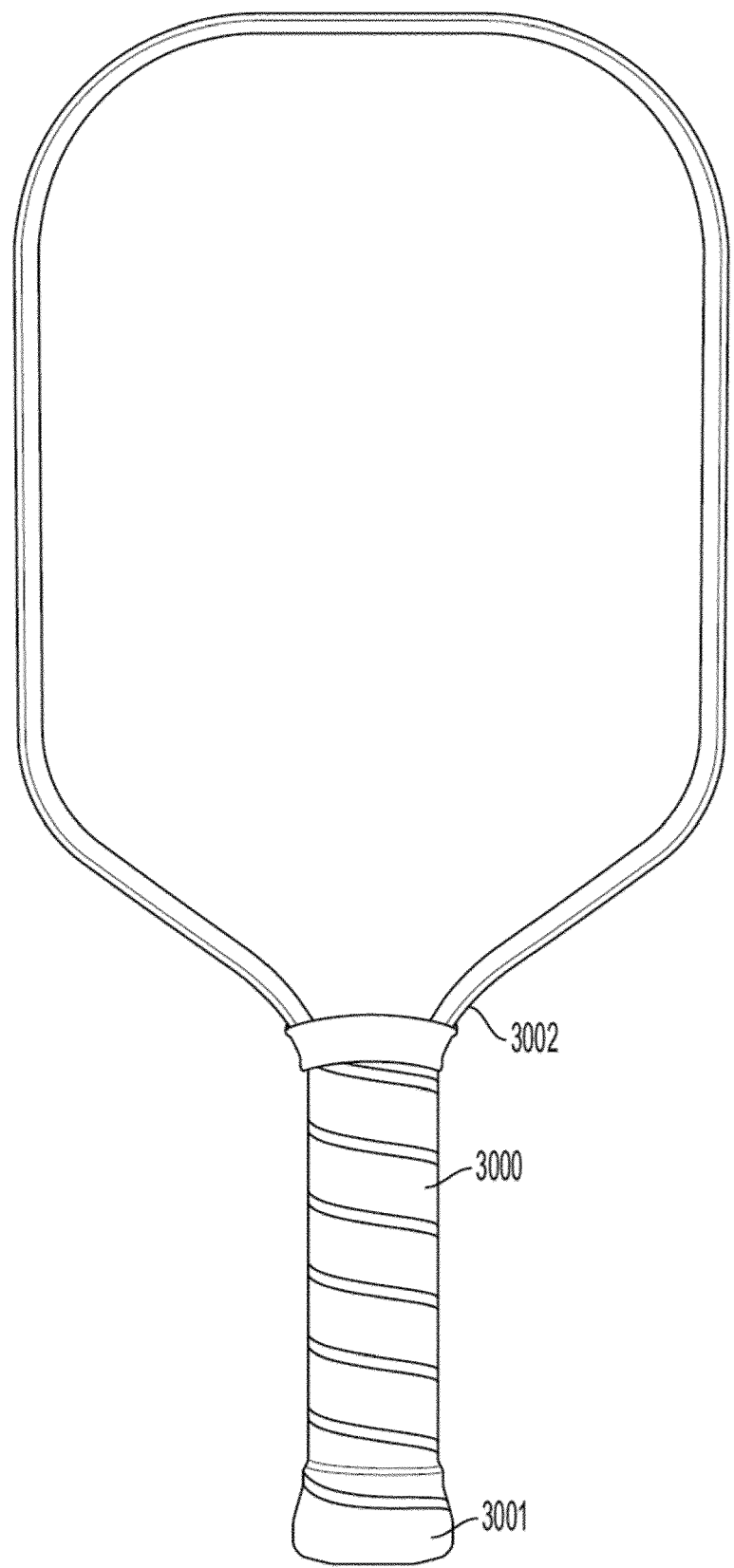
FIG. 30 shows a paddle, according to a representative example.

FIG. 30 is a drawing of a paddle, according to an example. The paddle can have an optional grip 3000, an optional end cap 3001, and an optional edge guard 3002. The edge guard can be used or not to cover the frame and a small area of the surfaces on both sides. The edge guard can be made from polyvinyl chloride (PVC), any type of polymer, thermoplastic, thermoset, elastomer, rubber, foam, expandable material, or a mixture of any of these. Example dimensions for such a paddle can be any as described herein, although these are just examples and any other dimensions can be used. When determining the locations/dimensions of the head, throat, handle, face, etc., the edge guard, end cap, and grip may not be used.

Figure 31:
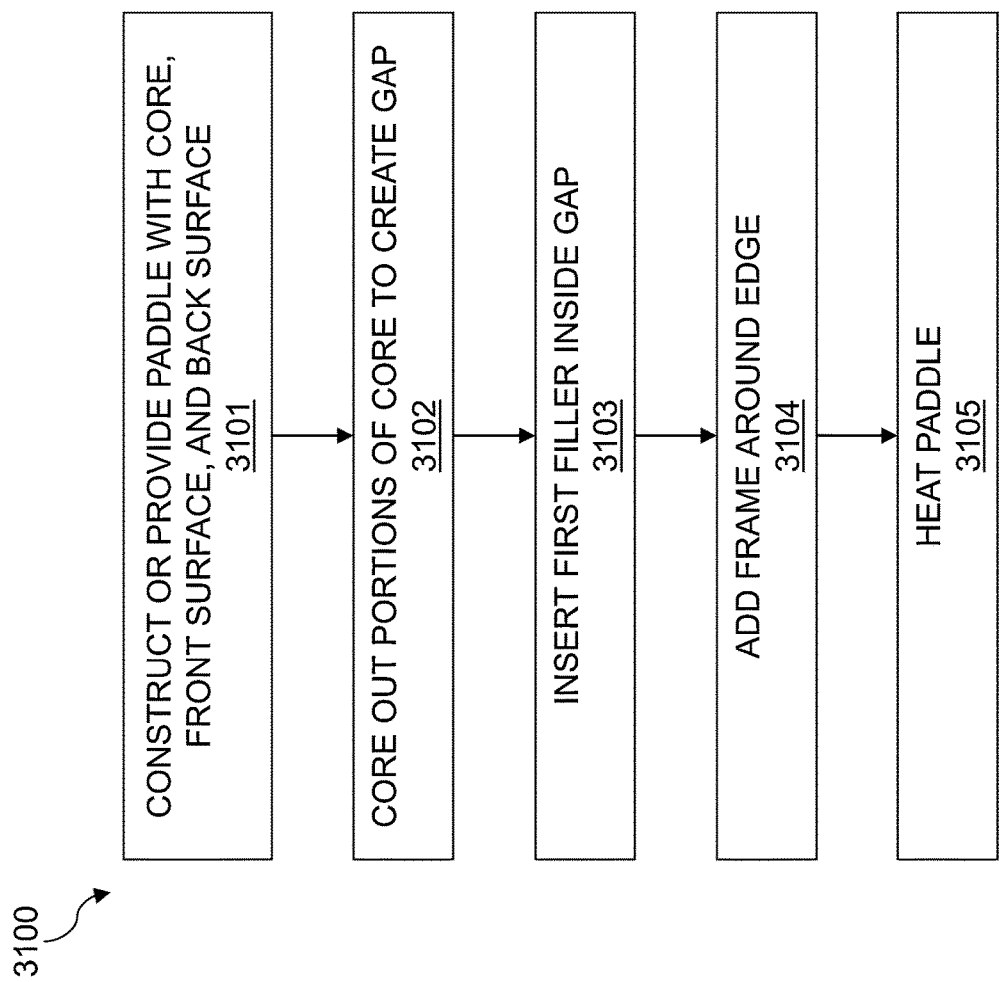
FIG. 31 is a flow chart of a method for making a paddle, according to a representative example.

FIG. 31 is a flow chart illustrating a method 3100 used to construct a paddle, according to an example. This method 3100 (and its individual operations) can be used to construct a paddle described or illustrated herein.

In operation 3101, a paddle can be constructed or provided. The paddle may be constructed from a core which can be comprised of any open-cell structure or lattice of polypropylene, aluminum, Nomex, Kevlar, or any other synthetic or natural material. Outer surfaces (e.g., front surface and back surface) can be comprised of any material, for example one, two, three, four, or more layers of unidirectional or weave of carbon, glass, or any natural or synthetic fiber and prepreg, impregnated with any kind of resin are commonly used for the outer surface. The front and back surface can be glued to the core, creating a "sandwich" of core between the front and back surfaces. See FIGS. 1A, 1B, 1C for an original paddle. Note that in an example, the front and back surface can be glued onto the core after the core is cored out, providing easier access to the core.

From operation 3101, the method can proceed to operation 3102, in which portions of the core are cored out (removed) to create a gap. This can be done by using a tool such as a router, running drill, press, saw, or any other mechanical tool. The coring can be performed through edges of the paddle (see FIG. 2). In the embodiment where the intended gap does not touch the edge of the core, the coring out of the core could be performed before assembling the sandwich structure (e.g., before attaching the front surface and back surface to the core). This method of coring out the core can also be done even if the gap does touch the edge of the core. The gap can be from 0.1 to 100 mm depth (from the edge to the center of the paddle), it can be continuous around all the paddle, or split in two, three, four, or more sections of different lengths, depths, and shapes. The height of the gap can vary from 0.1 to 25 mm or to the max thickness of the core. The gap can be of any shape, concave, convex, U shape, or others. There can also be shapes created within the core while the core is attached to the edge.

From operation 3102, the method proceeds to operation 3103, in which a filler (first filler) may be placed (inserted) into the gap. The filler can be pressurized (e.g., in a can) and sprayed in, or can be spread inside the gap using a tool (e.g., applicator gun such as a foam dispensing gun), or the like. The gap can be entirely filled in with the first filler or some gaps can still remain. In an example, the first filler can be cut to the exact shape of the gap and added by hand. The first filler can be an empty space (or pressured air and the frame can be airtight), or filled with any type of polymer, thermoplastic, thermoset, thermoplastic elastomer, elastomer, rubber, foam, polymeric foam, expandable material, or a mixture of them. The first filler material can be expandable, for example if the first filler material is foam it can be expandable foam. The first filler can be of any cross-section shape, the height can vary from 1 to 25 mm or to the max thickness of the core, the width (distance from the frame wall to the core) can vary from 0.1 to 50 mm. According to the gap geometries and shape, the first filler can be continuous around all the core or can be split in two, three, or more sections with same or different geometries, dimensions, and materials. The first filler can surround the entire paddle, just the head, or just specific areas.

From operation 3103, the method can proceed to operation 3104, which adds the frame to the edge of the paddle. The frame may be a hollow cuboid structure (or other structure which does not have to be hollow) which wraps around the entire edge of the paddle. The frame can be bendable in order to mold it to the shape of the edge of the paddle. An adhesive (e.g., glue, cement, etc.) can be used to adhere the frame to the paddle. The frame (e.g., carbon frame) may be bendable before a heating operation, but after a heating the resin may set and the frame may become hard. The frame can be adhered to the paddle by the resin in the carbon fiber, and because it gets hard, it may not change the shape of the frame. The frame can be made of carbon, glass, fiberglass, thermoplastic, or any synthetic or natural fiber with resin, plastic, rubber, metal, or any material that provides a rigid structure. To make the carbon frame, a sheet of carbon fiber prepreg (impregnated with thermoset resin) may be rolled to form a tube structure. Inside this tube there may be a piece (e.g., continuous and long, about the same length of the tube) of the second filler (such as expandable foam). The frame can be of any cross-section shape, height, width, and length. It can be an entire piece or can be split in two, three, or more sections with same or different geometries and dimensions. The frame can surround the entire paddle, just the head, just the handle, or just specific areas.

The frame can be hollow or filled with a filler (e.g., a second filler). This second filler can be of any polymer, thermoplastic, thermoset, thermoplastic elastomer, elastomer, rubber, foam, polymeric foam, expandable material, or a mixture of them. The second filler can be of any density, viscosity, and hardness. The second filler can be inserted into the frame using a number of alternate methods (in addition to those described herein), such as blowing it inside, injecting it, pressuring the second filler and then shooting it inside the frame, etc. The second filler (e.g., expandable foam) can be inserted into carbon frame by hand, it is a solid piece before the hot molding process. The second filler can be air and the frame can be airtight.

From operation 3104, the method proceeds to operation 3105, which heats up the paddle. Once the first filler has been added to the paddle (inside gap(s) in the core) and the frame has been added to surround the paddle, and the second filler is added inside the frame, and the front and back surface are attached (e.g., glued) to the core, then the paddle can be placed inside a mold. The frame can be bent around the edge (perimeter) of the paddle. The paddle can then be heated in the mold which has a shape to match the paddle. The mold is closed with high pressure inside and the temperature is raised inside the mold to around 100 degrees Celsius or more for 2-20 minutes or more. With the high temperature, the second filler inside the frame may expand so the frame gets its shape. The first filler inside the gap(s) also can expand therein. If expandable foam (e.g., a polymer with a foamy agent) is being used for the first filler and/or the second filler, then the expandable foam can expand and harden when heated. Also, with the high temperature, the resin impregnated in the frame may set (become hard) so it will be a solid piece after the mold is opened.

Note that all features, embodiments, method, step, etc., may be applied to any other embodiment described herein. In addition, all features, embodiments, methods, steps, etc., may be combined with any other without limitation. In addition, all paddles herein may be (unless stated otherwise) symmetrical, that is, the back side/surface may be identical to the front side/surface. For any side or portion of any paddle that is not shown or described in the drawings/specification, that side or portion may be identical (symmetrical) to its corresponding side or portion that has been shown (or identical/symmetrical to other paddles shown herein). For example, if the left side of a paddle is shown, if the right side of the paddle is not shown or described, it can be assumed that the appearance and structure of the right side is identical to the left. If the bottom of a paddle is not shown, it can be assumed that the bottom of that paddle is identical to a bottom shown of another paddle shown herein. As such, parts and structures described herein can be combined and mixed without limitation. The same would hold true for front and back surfaces, etc. Any part mentioned or illustrated can be made from any suitable material, including any material mentioned herein.

In certain aspects of the present teachings, a pickleball paddle may include: a front surface; a back surface opposing the front surface; a core disposed between the front surface and the back surface; a gap formed in at least a portion of the core; a first filler disposed within at least a portion of the gap; a frame disposed about at least a head portion of the pickleball paddle along an edge portion thereof, the frame at least partially disposed between the front surface and the back surface along the edge portion, the frame defining a hollow interior portion; and a second filler disposed within at least a portion of the hollow interior portion of the frame. Implementations may include one or more of the following. One or more of the first filler and the second filler may include a foam material. One or more of the first filler and the second filler may include at least one of: a polymer, a thermoplastic, a thermoset material, a thermoplastic elastomer, an elastomer, a rubber, and an expandable material. One or more of the first filler and the second filler may include pressurized air. The second filler and the first filler may be the same material. The second filler and the first filler may be different materials. The gap may be disposed, at least in part, between the frame and the core. The gap may border the frame. The frame may surround the entire pickleball paddle. The frame may include carbon fiber. The frame may be a hollow cuboid structure. The hollow cuboid structure may be formed from a single piece of material. The core may at least partially include a honeycomb structure. The paddle may further include an edge guard covering at least a portion of the frame along at least part of the head portion of the pickleball paddle.

In certain aspects of the present teachings, a pickleball paddle may include: a front surface; a back surface opposing the front surface; a core disposed between the front surface and the back surface; a gap formed in at least a portion of the core along a throat portion of the pickleball paddle; and a first filler disposed within at least a portion of the gap. The first filler may include a material structurally configured to absorb vibrations caused by striking a ball with one or more of the front surface and the back surface of the pickleball paddle. The pickleball paddle may further include a frame disposed about at least a head portion of the pickleball paddle along an edge portion thereof, the frame at least partially disposed between the front surface and the back surface along the edge portion, the frame defining a hollow interior portion fillable with a second filler.

In certain aspects of the present teachings, a method of manufacturing a pickleball paddle may include: forming a core of a pickleball paddle having a head portion and a handle portion; forming one or more gaps in the core of the pickleball paddle; inserting a first filler within at least a portion of the one or more gaps; wrapping a frame about a perimeter of the core; and affixing both a front surface and a back surface to the core wrapped by the frame. The frame may define a hollow interior portion. The method may further include inserting a second filler within at least a portion of the hollow interior portion of the frame.

The present teachings may include pickleball paddles and similar with a gap disposed on each side of the paddle near a throat portion thereof, where a filler is inserted therein. This filler may be viewable within such gaps—e.g., where an edge guard includes a void and/or window for viewing the filler and/or associated features, markings, colorings, or similar. These markings may, for example, provide information about various properties of the paddle, a filler material, and/or the core. A paddle according to the present teachings may have a frame (e.g., a frame that accommodates one or more gaps) or it may be frameless. In some aspects, a frame may also or instead include a filler disposed therein and/or adjacent thereto as described herein.

The design of a paddle as described herein may allow for the customization of various paddle characteristics, potentially leading to improved performance and user experience. For instance, the use of filler material within gaps of the core (or otherwise having gaps, with or without filler) may allow for adjustments in weight distribution, vibration dampening, and/or other performance characteristics. Further, the potential inclusion of a frame and an edge guard may contribute to the structural integrity and durability of a paddle.

It will be understood that one or more of the fillers described herein, e.g., with reference to any of the figures described herein, may include any of the features, characteristics, materials, material properties, and so on, of any one or more other fillers described herein. For instance, any of the one or more fillers (e.g., a first filler, a second filler, a third filler, and a fourth filler) may include any one or more of the following, or any combination thereof: a foam material, a polymer, a thermoplastic, a thermoset material, a thermoplastic elastomer, an elastomer, a rubber, an expandable material, a gas (e.g., pressurized air), a fluid, and the like. Further, one or more of the fillers may be the same as another filler found in the same paddle (e.g., a first filler and a second filler may be the same). Alternatively, one or more of the fillers may be different from another filler found in the same paddle (e.g., a first filler and a second filler may be different).

Figure 33:
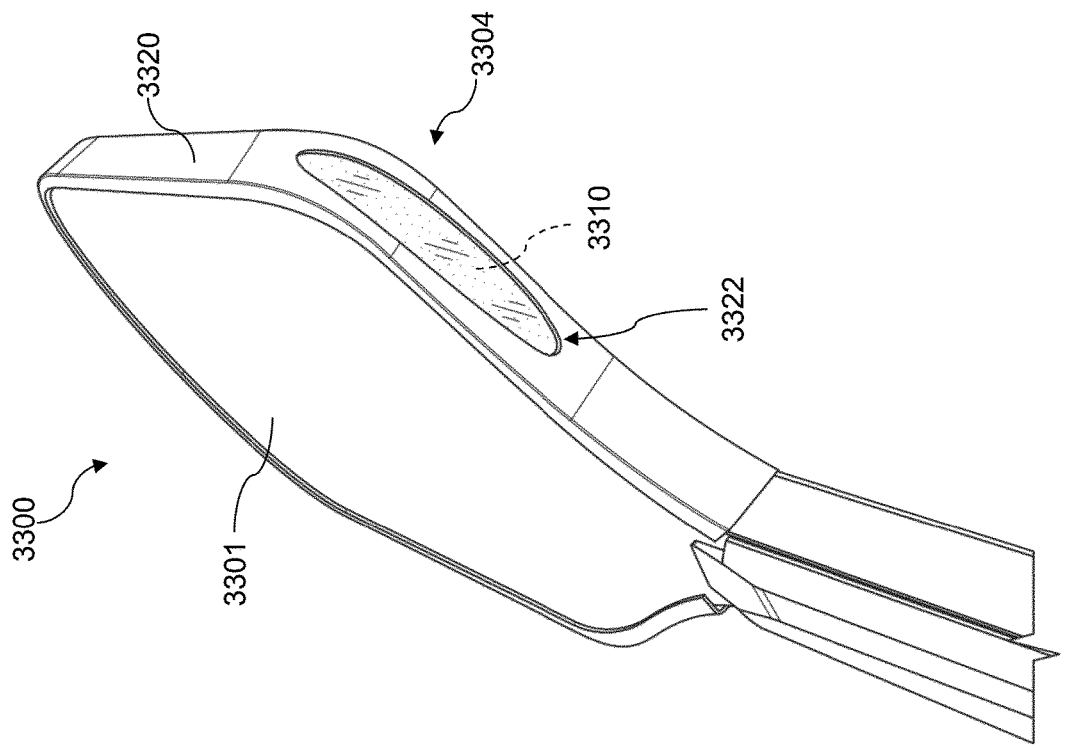
FIG. 33 shows a paddle with a viewable filler, according to a representative example.
Figure 32:
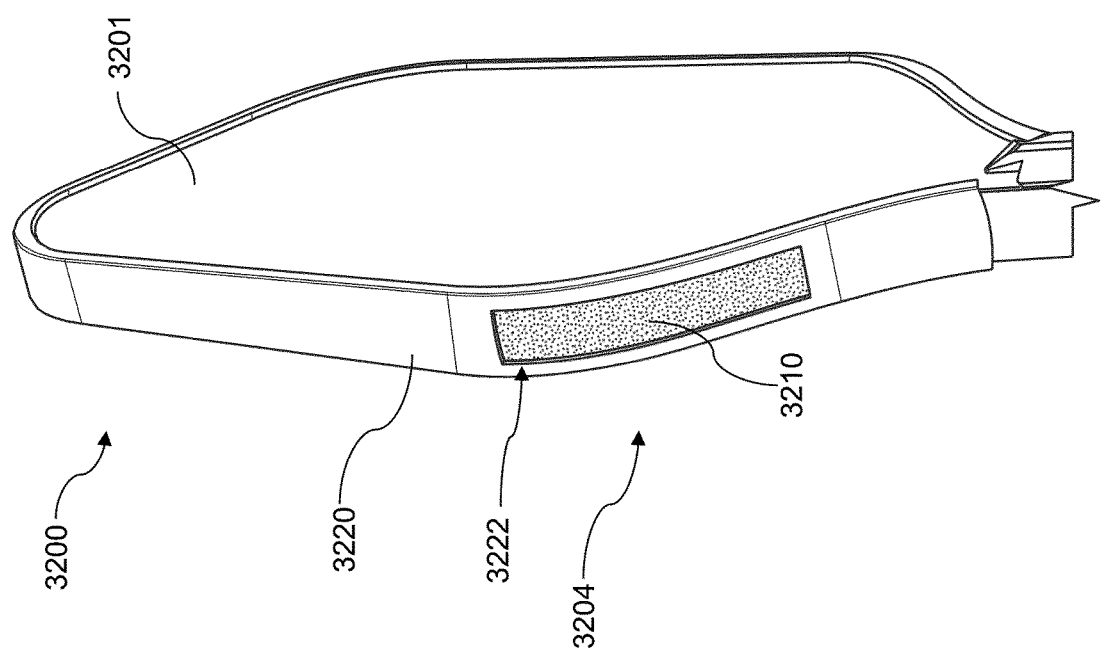
FIG. 32 shows a paddle with a viewable filler, according to a representative example.

FIGS. 32 and 33 show a paddle with a viewable filler, according to representative examples. Each paddle 3200, 3300 may include a playing surface 3201, 3301 (one of the first surface and second surface described herein), a core disposed between playing surfaces, a gap in the core adjacent to a throat portion 3204, 3304 of the paddle 3200, 3300, and a first filler 3210, 3310 disposed within the gap. Each paddle 3200, 3300 may further include an edge guard 3220, 3320.

The playing surface 3201, 3301 of the paddles 3200, 3300 (or any other paddle described herein) may be textured or otherwise structurally configured to enhance control and/or striking during play. For instance, a textured surface may increase friction between the paddle 3200, 3300 and a ball, potentially allowing for more precise shots or improved spin and/or control.

The gap, which is shown filled with the first filler 3210, 3310 in FIGS. 32 and 33, may be formed at or near the throat of the paddle 3200, 3300, e.g., where the head transitions to the handle. Other gaps are also or instead possible, such as any as described herein or shown in the accompanying figures. In some aspects, the gap(s) and/or filler(s) disposed therein may be viewable by a user in a finished paddle. Viewable gaps and/or fillers may serve a functional and/or aesthetic purpose. In some aspects, the filler material may be colored or otherwise marked, e.g., to provide a contrast with the other components of the paddle 3200, 3300. The color and/or marking of the filler material may be selected based on aesthetic considerations. Also, or instead, the color and/or marking of the filler material may be used to indicate certain properties of the paddle 3200, 3300, such as an intended user, a weight and/or weight distribution, a flexibility or other similar property, a material property (of one or more components or features of the paddle, including internal and/or external components or features), a performance characteristic, a make, model and/or branding, and the like.

In this manner, filler and/or other internal structures, materials, and the like contained within the paddle 3200, 3300 may include one or more markings therein or thereon. For example the first filler 3210, 3310 may include one or more markings. In some implementations, a marking indicates a property of one or more of the paddle 3200, 3300, a filler, a core, and the like. In some implementations, a marking includes a color of an internal component, such as a color of the first filler 3210, 3310. Also or instead, one or more markings may include a texture, an alphanumeric character, a symbol, a branding and/or logo, a scannable code (e.g., a QR code) or similar, an identification marking (e.g., a model number), a color code, an artistic marking, an engraving or inscription, a pattern, a label and/or tag, combinations thereof, and the like.

The edge guard 3220, 3320 may be similar to any as described herein or otherwise known in the art. Further, the edge guard 3220, 3320 may include a void 3222, 3322 (and/or window) to provide for viewing of, and/or to provide a visual indication of, an internal structure of the paddle 3200, 3300. This visibility may be achieved by forming a void 3222, 3322 and/or window in the edge guard 3220, 3320, e.g., to align with a gap in the core. That is, in some aspects, a paddle 3200, 3300 described herein includes an edge guard 3220, 3320 disposed along a perimeter of a head portion of the paddle 3200, 3300. The edge guard 3220, 3320 may define a void 3222, 3322 adjacent to one or more gaps in the paddle 3200, 3300—e.g., each of a first gap and a second gap disposed at or near a throat portion 3204, 3304 of the paddle 3200, 3300. By way of example, and as shown in FIG. 32, the void 3222 may be formed via a cutout in material of the edge guard 3220. And, in some aspects, such as that shown in FIG. 32, the first filler 3210 may be exposed to an external environment through the cutout in the edge guard 3220. Alternatively, and as shown in FIG. 33, the void 3322 may include an at least semi-transparent material (e.g., fully transparent, tinted, colored, and the like) through which the first filler 3310 is viewable. That is, a window may be formed over the void 3322 using transparent material or the like such that the first filler 3310 is viewable through the window and/or void 3322. This window may be formed by one or both of a covering over the void 3322 (e.g., over the top of the void 3322) and/or by insertion of an at least semi-transparent material within the void 3322.

Figure 34:
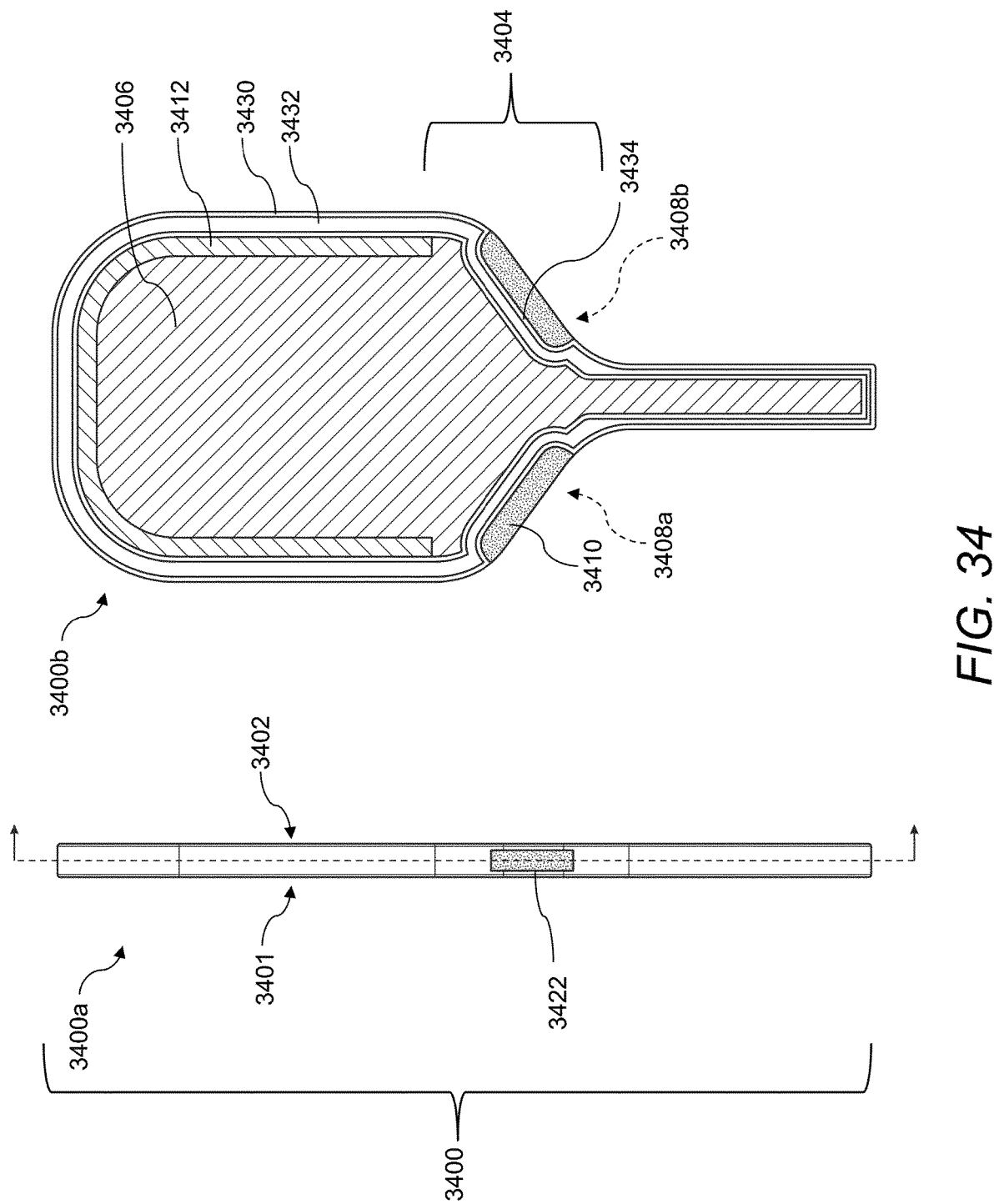
FIG. 34 shows a side view and a cross-sectional view of a paddle, according to a representative example.

FIG. 34 shows a side view 3400a and a cross-sectional view 3400b of a paddle 3400, according to a representative example. The paddle 3400 may include a first surface 3401 and a second surface 3402 opposing the first surface 3401. A core 3406 may be disposed between the first surface 3401 and the second surface 3402. The core 3406 may be made of a first material, e.g., polypropylene, aluminum, NOMEX, KEVLAR or another aramid, and/or any other synthetic and/or natural material. In general, the core 3406 may be any as described herein, e.g., a solid core and/or one including a honeycomb structure and/or an open-cell structure and/or lattice structure. It will be understood that the paddle 3400 shown in FIG. 34 may include any one or more of the features described above, e.g., with reference to FIGS. 1-33.

The paddle 3400 may include at least two gaps in the core 3406, e.g., a first gap 3408a and a second gap 3408b. These gaps may be defined by an absence of the material of the core 3406. In some aspects, the first gap 3408a may be disposed on a first side of the paddle 3400 substantially adjacent to a throat portion 3404 thereof, while the second gap 3408b may be disposed on a second side of the paddle 3400 substantially adjacent to the throat portion 3404. The first gap 3408a and the second gap 3408b may have a similar size and/or shape, or they may be different.

A first filler 3410 may be disposed within one or more of the first gap 3408a and the second gap 3408b (e.g., the first filler 3410 may be disposed within each of the first gap 3408a and the second gap 3408b). In certain aspects, the first filler 3410 is substantially the same within each of the first gap 3408a and the second gap 3408b. The first filler 3410 may infiltrate one or more of the first gap 3408a and the second gap 3408b by at least 5 millimeters. For example, the first gap 3408a and the second gap 3408b may extend inwardly by at least 5 mm from the perimeter of the paddle 3400. The first filler 3410 may fill the entire extent of one or more of the first gap 3408a and the second gap 3408b, or the first filler 3410 may infiltrate one or more of the first gap 3408a and the second gap 3408b by at least 5 mm leaving the remainder of the respective gap empty. In yet some other aspects, the filler is different within each of the first gap 3408a and the second gap 3408b—e.g., having a different material property and/or aesthetic appearance.

In some implementations, one or more other fillers may be present in other gaps in the core 3406, which may be the same as or different from the first filler 3410, e.g., a second filler 3412 and/or a third filler 3432 may also or instead be present. The fillers may be any as described herein, for example including without limitation one or more of a foam (e.g., Ethyl Vinyl Acetate (EVA) foam), a polymer, a thermoplastic, a thermoset, a thermoplastic elastomer, an elastomer, a rubber, an expandable material, a fluid (e.g., compressed air and/or another gas such as an inert gas), and the like. In certain aspects, the second filler 3412 and the first filler 3410 are the same; in other aspects, the second filler 3412 and the first filler 3410 are different. Similarly, in certain aspects, the third filler 3432 and the first filler 3410 are the same; in other aspects, the third filler 3432 and the first filler 3410 are different.

The paddle 3400 may further include a frame 3430 disposed between the first surface 3401 and the second surface 3402. In some aspects, the frame 3430 may be substantially disposed along, or adjacent to, a perimeter of a head portion of the paddle 3400. In some aspects, the frame 3430 is solid; in other aspects, the frame 3430 is hollow and/or includes one or more hollow portions. The frame 3430 may define an interior comprising a third filler 3432, which may be any as described herein, including a foam, compressed air or another inert gas, and similar. In some cases, the third filler 3432 may surround the core 3406 of the paddle 3400, and a portion of the frame 3430 and/or the second filler 3412 may be located between the third filler 3432 and the core 3406.

As stated herein and as shown in the figures, the frame 3430 may accommodate one or more gaps in the paddle 3400, e.g., the first gap 3408*a* and the second gap 3408*b*. For example, in certain implementations, the frame 3430 may include one or more indented portions 3434 that accommodate the first gap 3408*a* and the second gap 3408*b*, and/or other gaps disposed within the paddle 3400. For example, the frame 3430 may include one or more indented portions 3434 in the throat region of the paddle 3400, where the frame may extend continuously around the perimeter of the head region of the paddle and may be offset inwardly from the perimeter of the paddle in the indented portions. Alternatively, the frame 3430 may be absent along the first gap 3408*a* and the second gap 3408*b* (see, e.g., FIG. 37), or it may be shaped to form a boundary of each of the first gap 3408*a* and the second gap 3408*b* along an interior portion of the paddle 3400.

The paddle 3400 may include a gap formed in the core 3406 adjacent to the frame 3430 along an interior portion of the paddle 3400. This gap may extend, e.g., along a majority of a first side of the head portion, along a top of the head portion, and along a majority of a second side of the head portion. The second filler 3412 (or another filler) may be present within all of, or a portion of, this gap as shown in FIG. 34. In some aspects, a filler may be used to bond or otherwise adhere different internal portions of the paddle 3400. For example, the second filler 3412 may be used to form a bond between the core 3406 and the frame 3430.

An edge guard may be disposed along a perimeter of the head portion of the paddle 3400. The edge guard may define a void 3422 adjacent to each of the first gap 3408*a* and the second gap 3408*b*, through which the first filler 3410 may be viewable.

It will be understood that a plurality of gaps of different shapes and sizes may be present within the paddles described herein, where one or more fillers (the same or different fillers) may be present within all or a portion of these gaps. FIG. 34 shows one example cross-section of a paddle according to the present teachings, and FIGS. 35-37 below show further example cross-sections of paddles according to the present teachings, where it will be understood that different examples are also or instead possible without departing from the scope of this disclosure.

Figure 35:
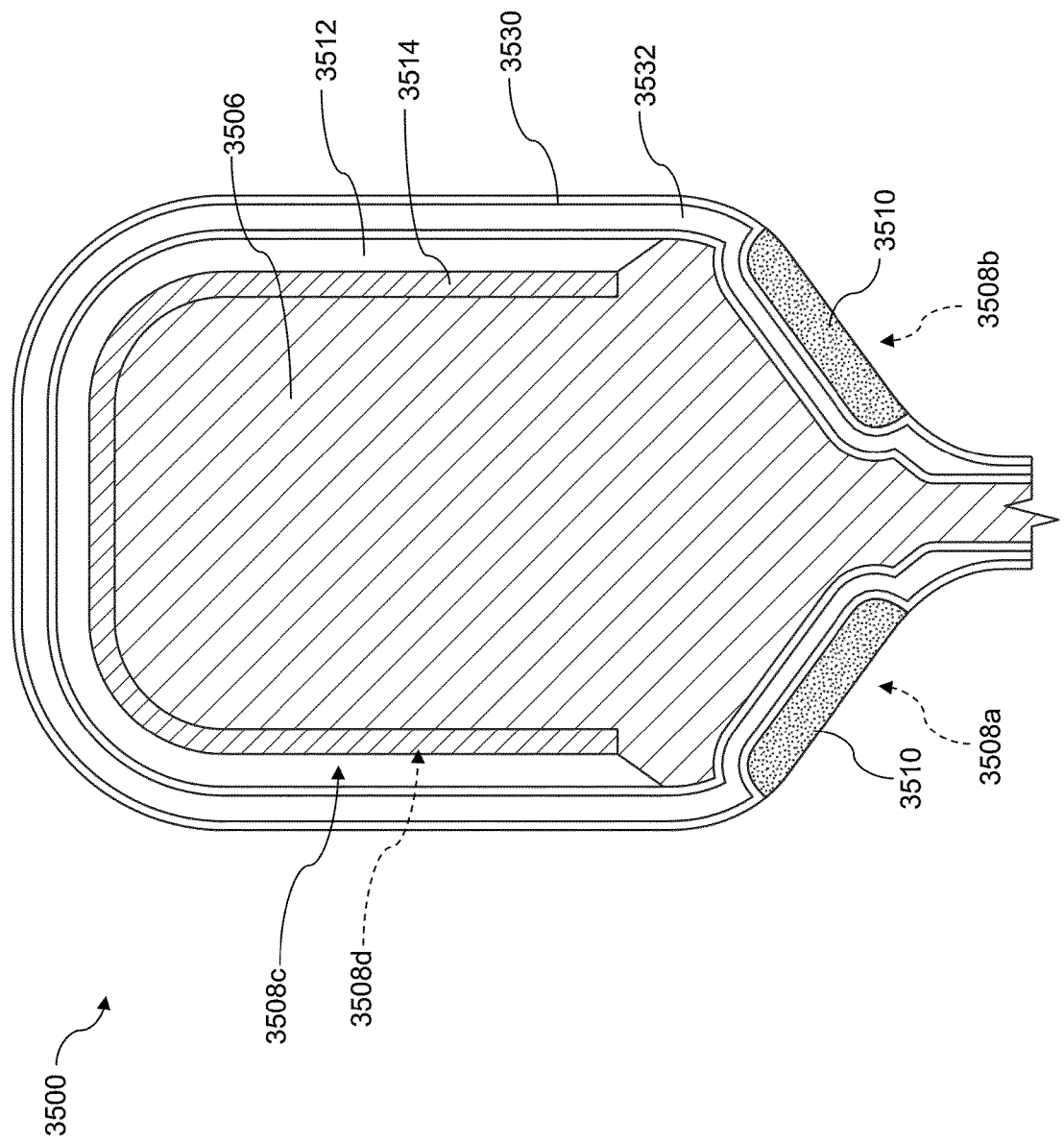
FIG. 35 shows a cross-sectional view of the head of a paddle, according to a representative example.

FIG. 35 shows a cross-sectional view of the head of a paddle, according to a representative example. The paddle 3500 may include a core 3506 disposed between a first surface and a second surface. In some aspects, the core 3506 may define multiple gaps, including a first gap 3508*a*, a second gap 3508*b*, a third gap 3508*c*, and a fourth gap 3508*d*. One or more of these gaps may be contain (wholly or partially) one or more fillers, such as any as described herein, where different gaps may include the same fillers as one another, or different fillers.

By way of example, the first gap 3508*a* and the second gap 3508*b* may contain a first filler 3510; the third gap 3508*c* may contain a second filler 3512 (or it may not contain any filler in certain aspects); and the fourth gap 3508*d* may contain a fourth filler 3514. In an aspect, one or more of the gaps (e.g., the third gap 3508*c* and the fourth gap 3508*d*) may occupy a shared region where material has been removed from the core 3506. In other words, a gap may not be, or may only partially be, adjacent to the core 3506. A gap may instead be wholly or partially adjacent to another gap. More or less gaps with more or less fillers may also or instead be included in the paddle 3500.

The paddle 3500 may further include a frame 3530 disposed along a perimeter of the paddle. In some aspects, the frame 3530 may define an interior comprising a third filler 3532. The frame 3530 may be shaped or configured to accommodate one or more of the various gaps and fillers within the paddle 3500.

The arrangement and configuration of the core 3506, gaps, fillers, and frame 3530—in this paddle 3500 and/or other paddles described herein—may allow for the customization and/or optimization of the paddle's performance characteristics, such as weight distribution, vibration dampening, and overall feel during play.

Figure 36:
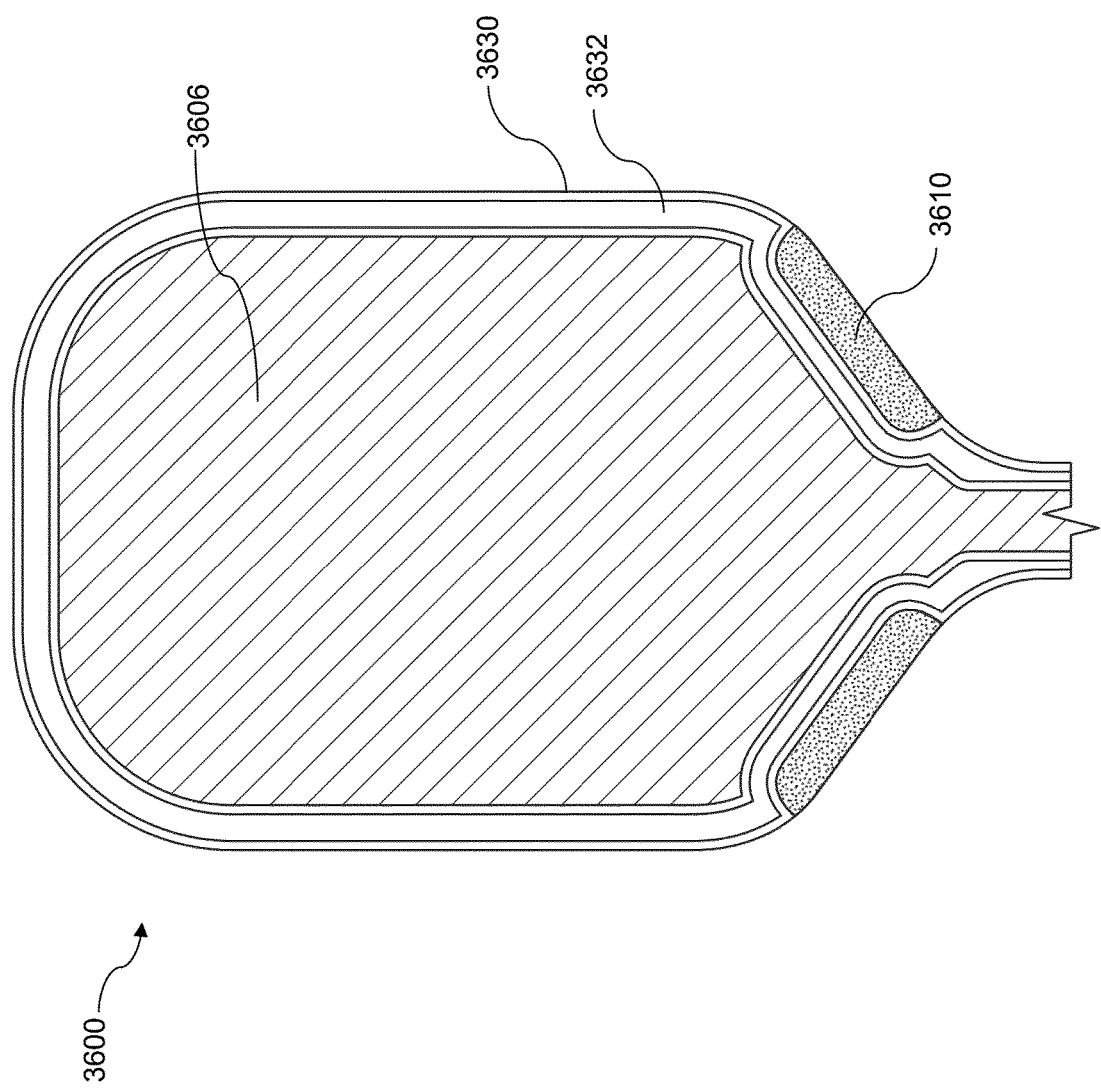
FIG. 36 shows a cross-sectional view of the head of a paddle, according to a representative example.

FIG. 36 shows a cross-sectional view of the head of a paddle, according to a representative example. The paddle 3600 shown in this figure may be similar to, and may include one or more features of, the paddle 3500 described above, but where the paddle 3600 of FIG. 36 does not include a third or fourth gap as shown above. That is, the paddle 3600 may include a core 3606 disposed between a first surface and a second surface, a first filler 3610 disposed within at least a portion of one or more gaps in the core 3606, and a frame 3630 disposed along a perimeter of the paddle. In some aspects, the frame 3630 may define an interior comprising a third filler 3632.

Figure 37:
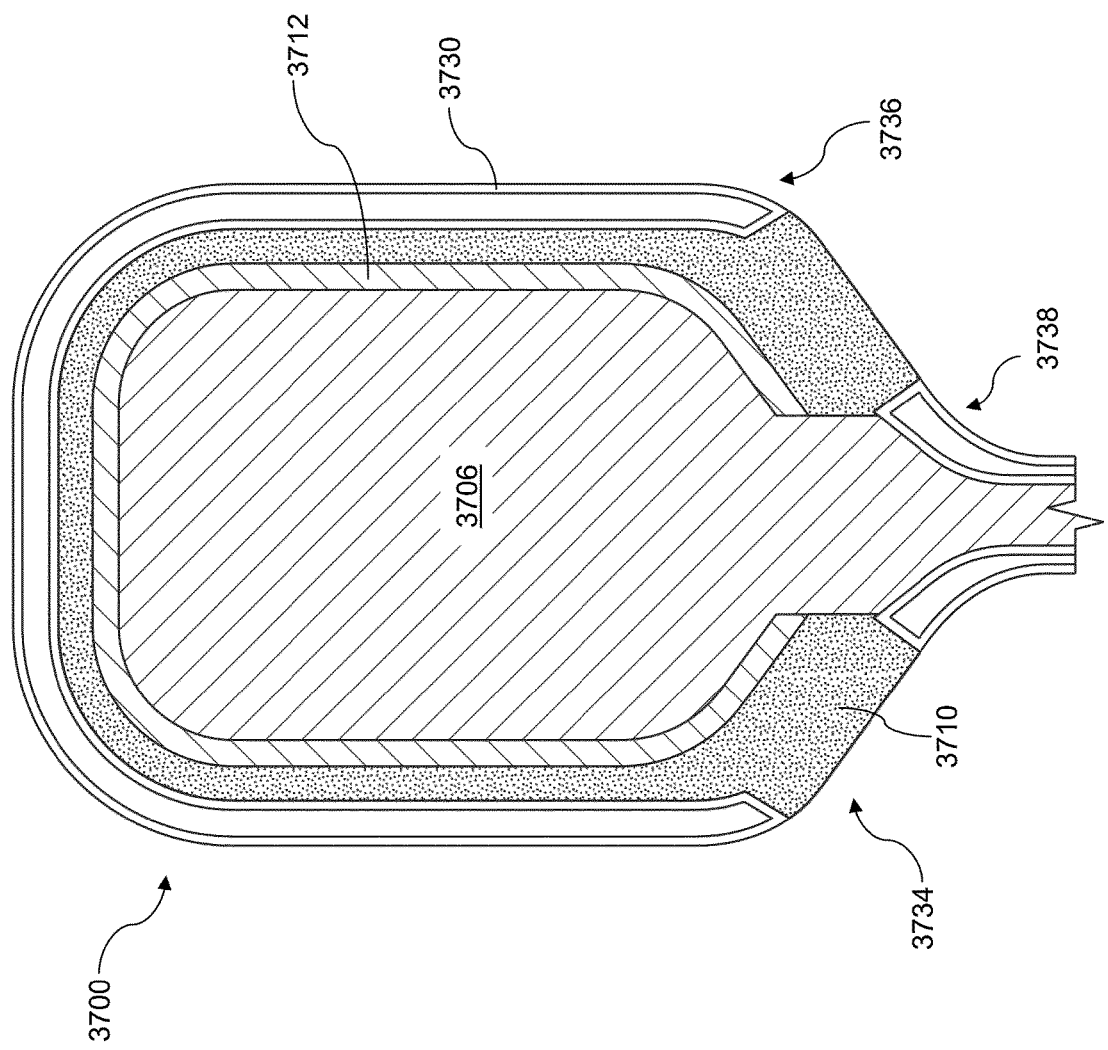
FIG. 37 shows a cross-sectional view of the head of a paddle, according to a representative example.

FIG. 37 shows a cross-sectional view of the head of a paddle, according to a representative example. The paddle 3700 shown in this figure may be similar to, and may include one or more features of, the paddles described above, but where the paddle 3700 of FIG. 37 includes a frame 3730 with multiple portions—e.g., a first portion 3736 and a second portion 3738.

In this manner, in certain aspects, the frame 3730 may include areas of absence 3734, where the frame 3730 is not present along certain sections of the paddle's perimeter. This configuration may allow for direct exposure of the core 3706 and/or fillers (e.g., the first filler 3710) to the perimeter of the paddle 3700 and/or an external environment.

Thus, the core 3706 may define one or more gaps, and a first filler 3710 may be disposed within at least a portion of one or more gaps in the core 3706. The first filler 3710 may extend along certain sections of the paddle's internal structure and/or perimeter, potentially providing targeted vibration dampening, weight distribution characteristics, and the like. In some implementations, a second filler 3712 may also be present within the paddle 3700, which may be the same as or different from the first filler 3710. The second filler 3712 may be positioned in different locations within the core 3706, potentially allowing for further customization of the paddle's performance characteristics. Other gaps and fillers may also or instead be present.

FIG. 38A shows a first view during formation of a paddle 3800 and FIG. 38B shows a second view during formation of a paddle 3800, according to a representative example. By way of example, the paddle 3800 may be a frameless paddle. The paddle 3800 may include a core 3806 disposed between a first surface and a second surface, where FIG. 38A shows cutout 3822 in the core 3806 to form a gap as described herein, where the gap may be filled with a first filler 3810 as shown in FIG. 38B. In some aspects, the cutout 3822 is formed in the core 3806 of the paddle 3800, and then the first and second surfaces are applied before the gap formed by the cutout 3822 is filled with a filler. Other manufacturing techniques are also or instead possible.

Figure 39:
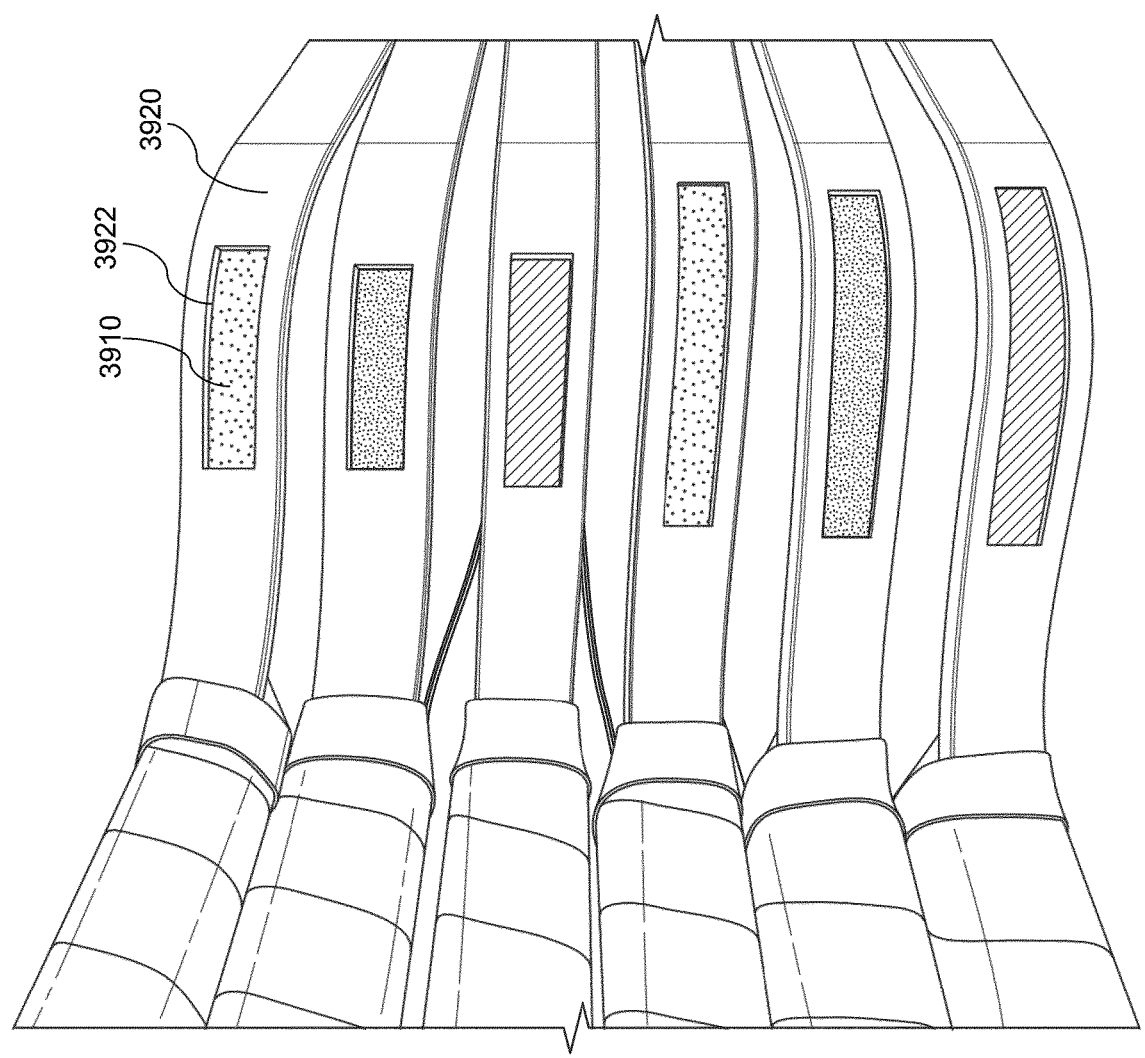
FIG. 39 shows a plurality of paddles, according to representative examples.

FIG. 39 shows a plurality of paddles, according to representative examples. As shown in the figure, the paddles may include an edge guard 3920 disposed along a perimeter of a head portion thereof. The edge guard 3920 may define a void 3922 adjacent to gaps that are filled with a filler, e.g., a first filler 3910. The void 3922 may allow for direct exposure of the first filler 3910 to the external environment, thereby providing visual indication of the paddle's internal structure or performance characteristics. The void 3922 may also or instead include an at least semi-transparent material (e.g., a clear filler) and/or window and/or covering, allowing for a visual indication of the paddle's internal structure or performance characteristics.

The paddles shown in FIG. 39 demonstrate how the fillers (and/or gaps and/or voids) may be different in different paddles—e.g., in visual appearance, size, shape, material properties, and the like. As described herein, the different visual appearance can indicate different models, brands, properties, and so forth, of different paddles.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

Unless the context clearly requires otherwise, throughout the description, the words "comprise," "comprising," "include," "including," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

It will be appreciated that the devices, systems, and methods described above are set forth by way of example and not of limitation. For example, regarding the methods provided above, absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A pickleball paddle, comprising:
a first surface;
a second surface;
a core disposed between the first surface and the second surface, the core comprising a first material;
at least two gaps in the core defined by absence of the first material of the core, a first gap of the at least two gaps disposed on a first side of the paddle substantially adjacent to a throat portion thereof, and a second gap of the at least two gaps disposed on a second side of the paddle substantially adjacent to the throat portion thereof;
a first filler disposed within one or more of the first gap and the second gap; and
a frame disposed between the first surface and the second surface, wherein the frame is accommodated by the first gap and the second gap, and wherein the frame is shaped to form a boundary of each of the first gap and the second gap along an interior portion of the paddle.

2. The pickleball paddle of claim 1, further comprising an edge guard disposed along a perimeter of a head portion of the paddle.

3. The pickleball paddle of claim 2, wherein the edge guard defines a void adjacent to each of the first gap and the second gap.

4. The pickleball paddle of claim 3, wherein the first filler is viewable through the void.

5. The pickleball paddle of claim 4, wherein the void includes an at least semi-transparent material through which the first filler is viewable.

6. The pickleball paddle of claim 4, wherein the first filler includes one or more markings.

7. The pickleball paddle of claim 6, wherein the one or more markings indicate a property of one or more of the paddle, the first filler, and the core.

8. The pickleball paddle of claim 6, wherein the one or more markings include a color of the first filler.

9. The pickleball paddle of claim 6, wherein the one or more markings include one or more of a texture and a pattern of the first filler.

10. The pickleball paddle of claim 3, wherein the void is formed via a cutout in material of the edge guard.

11. The pickleball paddle of claim 10, wherein the first filler is exposed to an external environment through the cutout.

12. The pickleball paddle of claim 1, wherein the frame is substantially disposed along, or adjacent to, a perimeter of a head portion of the paddle.

13. The pickleball paddle of claim 1, wherein the frame includes one or more indented portions that are accommodated by the first gap and the second gap.

14. The pickleball paddle of claim 12, further comprising a gap formed in the core adjacent to the frame along an interior portion of the paddle.

15. The pickleball paddle of claim 14, further comprising a second filler disposed within the gap.

16. The pickleball paddle of claim 15, wherein the second filler and the first filler are the same.

17. The pickleball paddle of claim 15, wherein the second filler and the first filler are different.

18. The pickleball paddle of claim 15, wherein one or more of the first filler and the second filler include at least one of: a foam, Ethyl Vinyl Acetate (EVA) foam, a polymer, a thermoplastic, a thermoset, a thermoplastic elastomer, an elastomer, a rubber, an expandable material, and a fluid.

19. The pickleball paddle of claim 15, wherein the frame defines an interior comprising a third filler.

20. The pickleball paddle of claim 19, wherein the third filler and the first filler are the same.

21. The pickleball paddle of claim 19, wherein the third filler and the second filler are different.

22. The pickleball paddle of claim 19, wherein the third filler includes compressed air.

23. The pickleball paddle of claim 1, wherein the first filler is disposed within each of the first gap and the second gap.

24. The pickleball paddle of claim 1, wherein the first filler infiltrates one or more of the first gap and the second gap by at least 5 millimeters.

25. The pickleball paddle of claim 1, wherein the first filler includes one or more of a foam, Ethyl Vinyl Acetate (EVA) foam, a polymer, a thermoplastic, a thermoset, a thermoplastic elastomer, an elastomer, a rubber, an expandable material, and compressed air.

26. A pickleball paddle, comprising:
a first surface;
a second surface;
a core disposed between the first surface and the second surface, the core comprising a first material;
at least two gaps in the core defined by absence of the first material of the core, a first gap of the at least two gaps disposed on a first side of the paddle substantially adjacent to a throat portion thereof, and a second gap of the at least two gaps disposed on a second side of the paddle substantially adjacent to the throat portion thereof;
a first filler disposed within one or more of the first gap and the second gap; and
a frame disposed between the first surface and the second surface, wherein the frame is accommodated by the first gap and the second gap via the frame including one or more indented portions that are accommodated by the first gap and the second gap.

27. The pickleball paddle of claim 26, further comprising an edge guard disposed along a perimeter of a head portion of the paddle.

28. The pickleball paddle of claim 27, wherein the edge guard defines a void adjacent to each of the first gap and the second gap.

29. The pickleball paddle of claim 28, wherein the first filler is viewable through the void.

\* \* \* \* \*